(12) United States Patent
Wellman

(10) Patent No.: US 10,366,366 B1
(45) Date of Patent: *Jul. 30, 2019

(54) ENTITY TRACKING FOR KIVA ROBOTIC FLOORS

(71) Applicant: Amazon Technologies, Inc., Seattle, WA (US)

(72) Inventor: Parris S. Wellman, Reading, MA (US)

(73) Assignee: Amazon Technologies, Inc., Seattle, WA (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/450,692

(22) Filed: Mar. 6, 2017

Related U.S. Application Data

(63) Continuation of application No. 14/660,247, filed on Mar. 17, 2015, now Pat. No. 9,607,285.

(51) Int. Cl.
*G06Q 10/08* (2012.01)
*G05B 19/418* (2006.01)
*G05D 1/00* (2006.01)
*G05D 1/02* (2006.01)

(52) U.S. Cl.
CPC ....... *G06Q 10/087* (2013.01); *G05B 19/4189* (2013.01); *G05D 1/0027* (2013.01); *G05D 1/0088* (2013.01); *G05D 1/0291* (2013.01)

(58) Field of Classification Search
CPC ...... G05B 19/4198; G05B 2219/31–45; G05B 19/18; G06Q 10/00–08; G05D 1/02; G05D 1/021; E02F 9/26; E02F 9/203
USPC ......... 700/213–255; 235/385; 701/2, 23, 25, 701/26, 301; 324/202, 325, 463, 346
See application file for complete search history.

(56) References Cited

U.S. PATENT DOCUMENTS

| 8,280,547 B2 | 10/2012 | D'Andrea et al. |
| 8,412,400 B2 * | 4/2013 | D'Andrea ........ G05B 19/41895 701/23 |
| 8,504,202 B2 * | 8/2013 | Ichinose ................ G05D 1/024 700/253 |

(Continued)

OTHER PUBLICATIONS

U.S. Appl. No. 14/660,247, "Non-Final Office Action", dated Jan. 13, 2016, 25 pages.

(Continued)

*Primary Examiner* — Olusegun Goyea
(74) *Attorney, Agent, or Firm* — Kilpatrick Townsend & Stockton LLP

(57) ABSTRACT

Techniques for providing an entity monitoring safety feature in an inventory management system may be described. For example, information that indicates respective locations for a plurality of mobile drive units within an inventory management system may be received. Tracking information may be received from a mobile location unit that is moving within a bounded area around a signal transmitter that is coupled to an entity. The tracking information may include an approximate location of the signal transmitter relative to the mobile location unit. Pathway information may be generated that indicates to the plurality of mobile drive units within the inventory management system to stay outside of a radius distance of the mobile location unit based on the received tracking information. The generated pathway information may be provided to the plurality of mobile drive units to enable safe passage for the entity within the inventory management system.

19 Claims, 11 Drawing Sheets

(56) References Cited

U.S. PATENT DOCUMENTS

| | | | | |
|---|---|---|---|---|
| 8,538,692 B2* | 9/2013 | Wurman | | G06Q 10/08 340/988 |
| 8,606,392 B2* | 12/2013 | Wurman | | G05B 19/4189 700/214 |
| 9,070,275 B1* | 6/2015 | Green | | H04W 4/029 |
| 9,073,736 B1* | 7/2015 | Hussain | | B66F 9/063 |
| 9,087,314 B2 | 7/2015 | Hoffman et al. | | |
| 9,607,285 B1 | 3/2017 | Wellman | | |
| 10,081,106 B2 | 9/2018 | Rublee et al. | | |
| 2005/0077085 A1* | 4/2005 | Zeller | | E21B 47/02224 175/45 |
| 2007/0290040 A1* | 12/2007 | Wurman | | G06Q 10/087 235/385 |
| 2007/0293978 A1* | 12/2007 | Wurman | | G05B 19/4189 700/213 |
| 2008/0051984 A1* | 2/2008 | Wurman | | G06Q 10/08 701/532 |
| 2008/0051985 A1* | 2/2008 | D'Andrea | | G05B 19/41895 701/410 |
| 2008/0309345 A1* | 12/2008 | Zeller | | E21B 47/02224 324/326 |
| 2009/0043462 A1* | 2/2009 | Stratton | | E02F 9/2033 701/50 |
| 2009/0109049 A1* | 4/2009 | Frederick | | F16P 3/14 340/686.6 |
| 2009/0256751 A1* | 10/2009 | Zeller | | E21B 47/02224 342/463 |
| 2010/0219835 A1* | 9/2010 | Wentworth | | E21B 7/04 324/346 |
| 2010/0271009 A1* | 10/2010 | Zeller | | E21B 47/02224 324/202 |
| 2011/0010023 A1* | 1/2011 | Kunzig | | G01S 5/16 701/2 |
| 2011/0062959 A1* | 3/2011 | Zeller | | E21B 47/02224 324/326 |
| 2011/0093134 A1* | 4/2011 | Emanuel | | G05D 1/0289 701/2 |
| 2012/0143427 A1 | 6/2012 | Hoffman et al. | | |
| 2012/0239224 A1 | 9/2012 | McCabe et al. | | |
| 2013/0038320 A1* | 2/2013 | Frederick | | G08B 21/22 324/207.13 |
| 2013/0275045 A1 | 10/2013 | Tsujimoto et al. | | |
| 2013/0302132 A1* | 11/2013 | D'Andrea | | G06Q 10/08 414/807 |
| 2013/0317642 A1* | 11/2013 | Asaria | | G06Q 10/08 700/216 |
| 2014/0100998 A1* | 4/2014 | Mountz | | G06Q 10/08 705/28 |
| 2014/0100999 A1* | 4/2014 | Mountz | | G06Q 10/087 705/28 |
| 2015/0066283 A1* | 3/2015 | Wurman | | G05D 1/0214 701/25 |
| 2015/0353280 A1* | 12/2015 | Brazeau | | G05D 1/00 700/214 |

OTHER PUBLICATIONS

U.S. Appl. No. 14/660,247, "Non-Final Office Action", dated Jul. 29, 2016, 39 pages.
U.S. Appl. No. 4/660,247, "Notice of Allowance", dated Dec. 2, 2016, 15 pages.
U.S. Appl. No. 15/240,938, filed Aug. 18, 2016, Titled: AGV Traffic Management System.

* cited by examiner

ENTITY TRACKING FOR KIVA ROBOTIC FLOORS

CROSS-REFERENCE TO RELATED APPLICATIONS

This application is a continuation of U.S. patent application Ser. No. 14/660,247, filed Mar. 17, 2015, now U.S. Pat. No. 9,607,285 issued on Mar. 28, 2017, entitled "ENTITY MONITORING FOR KIVA ROBOTIC FLOORS," the content of which is hereby incorporated by reference in its entirety.

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, wireless network setup and manpower, can result in lower throughput, unacceptably long response times, an ever-increasing backlog of unfinished tasks, and, in general, poor system performance. Particular safety issues may arise when dealing with an automated or semi-automated inventory system that creates further inefficiencies. For example, an entire warehouse may need to be shut down for a period of time to allow for maintenance to be performed on a particular portion of the warehouse or to fix a part of the automated inventory management system. Other solutions for performing maintenance or attempting to fix a problem in an automated/semi-automated inventory system may pose safety concerns that are unacceptable for entities.

BRIEF DESCRIPTION OF THE DRAWINGS

Various embodiments in accordance with the present disclosure will be described with reference to the drawings, in which.

DETAILED DESCRIPTION

Figure 1:
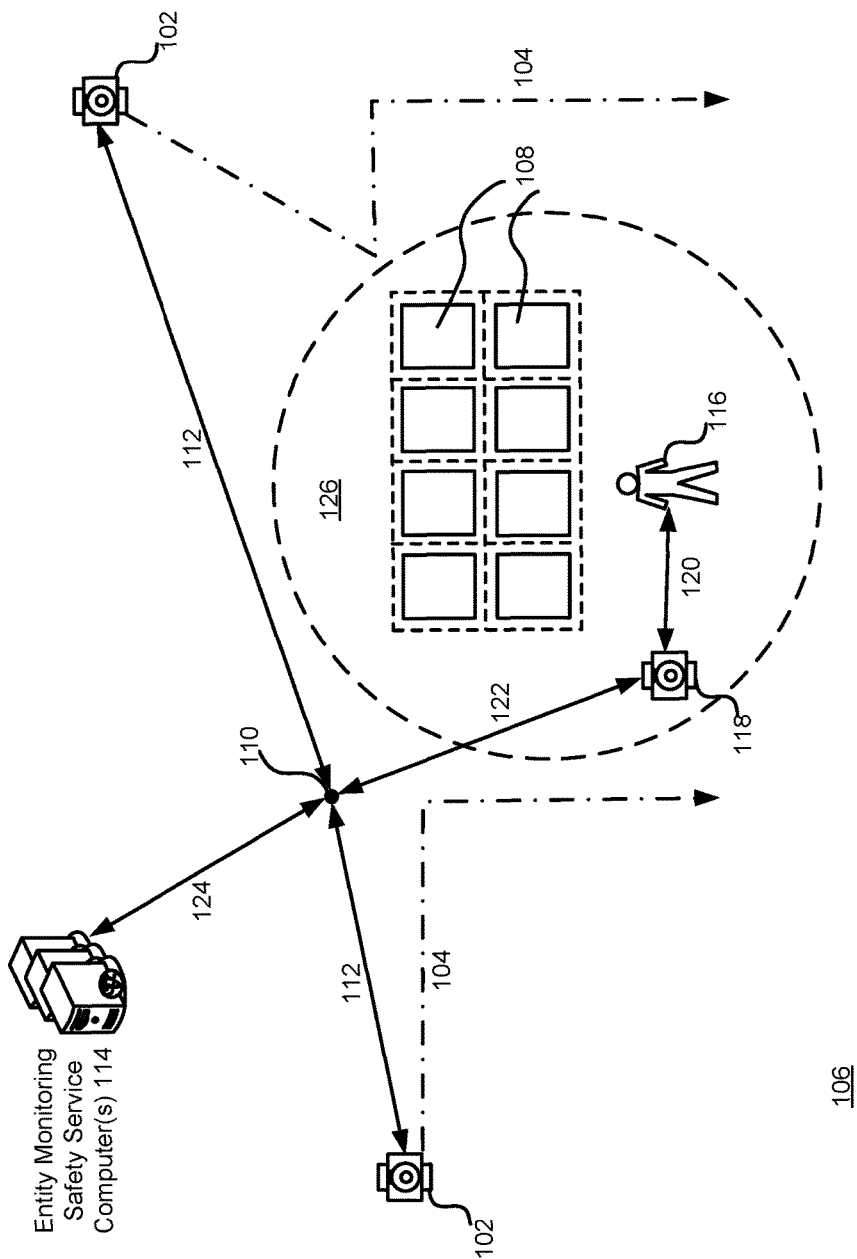
FIG. 1 illustrates an example workflow of an entity monitoring safety feature in an inventory management system, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein are directed to an inventory system having multiple inventory holders and drive units for moving the inventory holders. Specifically, systems and methods are provided for an entity (e.g., a human) monitoring safety feature in an inventory management system that, inter alia, manages location information between mobile drive units, tracks information between a mobile location unit associated with an entity that is accessing the inventory management system, and generates instructions to provide to the mobile drive units that ensure safe passage to the entity in the inventory management system.

In a non-limiting example, a person associated with the materials handling facility may request to enter the materials handling facility to perform maintenance on a portion of the materials handling facility. The materials handling facility may include a plurality of mobile drive units for automatically or semi-automatically moving inventory or performing other tasks within the inventory management system according to generated paths. A computer system implementing the entity monitoring safety feature may receive respective location information from the plurality of mobile drive units as they move through the materials handling facility. Further, the computer system my receive tracking information from a mobile location unit assigned to physically follow and track the movement and location of the person as they enter and move throughout the materials handling facility. The person may be wearing or holding a signal transmitter to enable the mobile location unit to capture the tracking information. The signal transmitter may include an ultra-wide band (UWB) radio transmitter that corresponds to a UWB receiver on the mobile location unit. As the person travels throughout the materials handling facility, the computer system may generate and provide paths for the plurality of mobile drive units based on the received tracking information. The newly generated paths may enable the plurality of mobile drive units to avoid being within a specified range of the person no matter where he travels throughout the facility. Further, the computer system implementing the entity monitoring safety feature may generate and provide instructions to stop the movement of a portion of the plurality of mobile drive units effectively creating a zone around the person where mobile drive units are instructed not to enter.

In accordance with at least one embodiment an inventory management system may have multiple access points situated in a materials handling facility, e.g., warehouse, distribution center, fulfillment center, etc. The inventory management system may also have at least one mobile drive unit for communicating data, via the access points, indicating a respective location of the mobile drive unit in the materials handling facility to a computer system implementing the entity monitoring safety feature. The inventory management system may also have a mobile location unit for communicating tracking information that enables an entity to access the inventory management system safely. The mobile location unit may also communicate its respective location in the materials handling facility to the computer system. A mobile drive unit may include an autonomous vehicle, an unmanned aerial vehicle or other autonomous land, water, and/or air-based vehicle. If desired, the location information indicating the respective locations of the plurality of mobile drive units and the tracking information from the mobile location unit can be provided to a user, such as an administrator of the inventory management system. As described above, the computer system may generate various instructions that may be communicated, via the access points, to the plurality of mobile drive units and the mobile location unit, for enabling safe access by a working entity to the materials handling facility as the plurality of mobile drive units continue to move throughout the system.

In accordance with at least one embodiment, the plurality of mobile drive units may provide their respective locations to the computer system as they move throughout the inventory management system. Further, a mobile location unit may be assigned or currently following a user that is walking around the inventory management system. As the mobile location unit follows the person tracking information may be captured and continuously communicated to the computer system via the access points situated around the inventory management system. The tracking information may include the approximate location of the person relative to the mobile location unit. The location information and tracking information may be utilized by the computer system to generate new pathways for the plurality of mobile drive units. By utilizing the new pathways the plurality of mobile drive units can avoid crashing into or being near the person as they walk through the facility and continue to move within the inventory management system.

In embodiments, the plurality of mobile drive units may be outfitted to receive an indication that a person is within a radius distance of themselves as they move throughout the inventory management system. For example, each mobile drive unit may be configured to utilize a signal receiver that corresponds to a signal transmitter that the person is holding for capturing the indication that the person is within the radius distance of the mobile drive unit. Thus, a disparate group of mobile drive units can effectively act as a mobile location unit. Further, the computer system can utilize the location information and the indication to provide instructions for mobile drive units near the source of the indication (or within a bounded area around the person) to stop moving thereby enabling safe passage of the person throughout the facility. In some examples, the features described herein may be performed via a distributed set of units, as opposed to a single drive unit. As such, although embodiments described herein include communication between various mobile drive units, a mobile location unit, and one or more computer systems configured to enable the entity monitoring safety feature in an inventory management system, a distributed set of logic units can perform the operations described herein. For example, the plurality of mobile drive units may be configured to utilize distributed processing for maintaining location information, obtaining tracking information, generating new paths, generating and providing instructions for mobile drive units to avoid an area, and/or assigning a portion of the mobile drive units to direct a working entity through the inventory management system.

The mobile drive unit and/or mobile location unit may be configured to utilize an imaging device or scanner for reading fiducial markings located throughout the inventory management system to determine the location of the mobile drive unit and/or mobile location unit are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280, 547, issued on Oct. 2, 2012, titled "METHOD AND SYSTEM FOR TRANSPORTING INVENTORY ITEMS," the entire disclosures of which are herein incorporated by reference. For example, the inventory management system may utilize light emitting elements, such as optical fibers that conduct light from one or more light sources and emit the conducted light at defined physical locations distributed within the inventory management system. The mobile drive unit and/or mobile location unit may capture an image of one or more of the light emitting elements when moving throughout the inventory management system and the image may be processed to determine the location of the mobile drive unit and/or mobile location unit within the inventory management system. In an embodiment, a computer system implementing the features described herein may utilize a mapping between captured image to light emitting element placement to determine the location of the mobile location unit and/or drive unit or unique light signal(s) detected at various locations may be utilized to determine the location of the mobile location unit and/or drive unit. In embodiments, the inventory management system may utilize barcodes, radio frequency identification (RFID) tags, and any other suitable identifiers that may be scanned or read by the mobile drive unit and/or mobile location unit to determine the location of the unit within the inventory management system. For example, unique barcodes may be associated with inventory holders distributed in the materials handling facility. As a mobile drive unit moves throughout the facility an associated scanner may read the barcode and communicate the information contained therein to a computer system that can determine the location of the mobile drive unit based on the scanned barcode. In accordance with at least one embodiment, one or more fiducial markers may be placed throughout the inventory management system at a distance that an image capture device (such as a camera) can capture an image of the one or more fiducial markers. The fiducial markers may be placed in such a way that a captured image will create a unique combination for each location of a mobile drive unit and/or mobile location unit within the inventory management system.

FIG. 1 illustrates an example workflow of an entity monitoring safety feature in an inventory management system, in accordance with at least one embodiment. FIG. 1 includes one or more mobile drive units 102 traveling along paths 104 as they move within a materials handling facility 106. The materials handling facility may include one or more inventory holders 108 and an access point 110 for communicating respective location information 112 from the one or more mobile drive units 102 to an entity monitoring safety service computer(s) 114. FIG. 1 also includes a working entity 116 accessing or interacting with the inventory holders 108 or another part of the materials handling facility 106, in which a mobile location unit 118 physically follows and tracks the working entity 116. In an embodiment, the mobile location unit 118 is configured to stay within a bounded area around the working entity 116 for capturing and communicating tracking data to the entity monitoring safety service computer(s) 114 and respective location information for the mobile location unit 118. In accordance with at least one embodiment, the mobile location unit 118 may be outfitted with a UWB radio receiver and the working entity 116 may be associated with a UWB radio transmitter enabling the mobile location unit 118 to capture the tracking data which includes at least the location of the working entity 116 relative to the mobile location unit 118.

In accordance with at least one embodiment, the bounded area may be determined by the entity monitoring safety service computers 114 with the bounded area having an epicenter focused on the working entity 116 or the mobile location unit 118. Further, the bounded area may correspond to a default size (e.g., 5 meters, 10 meters, or some other default amount) around the mobile location unit 118 or working entity 116. In embodiments, the bounded area may be determined based on any single factor or combination of factors related to the working entity 116, the mobile drive units 102, the mobile location units 118, the materials handling facility 106 or any other components of the system, such as, for example, the location of the working entity 116 within the materials handling facility 106, the speed of the working entity 116, the state of the materials handling facility 106, characteristics of the materials handling facility 106, and/or information indicating whether a particular mobile drive unit is laden or un-laden with inventory. The tracking data may include the relative location of the working entity 116 and the speed of the working entity 116. The state of the materials handling facility 106 may include at least the number of active mobile drive units 102, the speed of the mobile drive units 102 including their locations and intended destinations, drop out zones or areas of weak communication signal reception for the mobile drive units 102 and/or mobile location units 118, number of active mobile location units 118, or any suitable information that may be obtained from the inventory management system regarding the state of the materials handling facility 106. The characteristics of the materials handling facility 106 may include geometric characteristics of the facility such as barriers (inventory holders 108, fences, walls, shelving, etc.), slopes, drop offs, raised areas, loading/unloading zones, workstations, processing areas, or any suitable characteristics of the materials handling facility 106 including map information or floor layout information (such as information about the architectural layout of the facility 106).

As an illustrative example, the geometric boundaries of the bounded area may be determined and adjusted, by the entity monitoring safety service computers 114, based on the speed of the working entity 116, as captured by the mobile location unit 118, and the location of the mobile location unit 118. For example, if the working entity 116 is moving quickly through the materials handling facility 106 according to the tracking data, then a large bounded area may be determined, whereas if the working entity 116 is moving slowly according to the tracking data, then a small bounded area may be determined. As another example, the entity monitoring safety service computers 114 may utilize the tracking data (which may indicate that the working entity is moving quickly) and the state of the materials handling facility 106 (which may indicate that a high number of mobile drive units 102 are active and moving throughout the facility 106) to determine that a large bounded area should be generated and communicated to the mobile location unit 118 effectively creating a zone for the mobile drive units 102 to avoid. The determined bounded area of avoidance around the working entity 116 may be adjusted or determined initially based on the characteristics of the materials handling facility 106. For example, the bounded area may be reduced in size based on the tracking data indicating that the working entity 116 is immobile and/or near a loading/unloading station or other processing areas as a number of mobile drive units 102 may still need access to nearby loading/unloading stations or other processing areas and be at low risk of contacting the working entity 116. The characteristics of the materials handling facility may indicate that the working entity 116 is moving through a part of the facility that has high fences or walls which would prevent a mobile drive unit 102 from contacting the working entity 116. In response to this indication, the bounded area may be adjusted or determined to properly reflect the geometric or architectural attributes of the materials handling facility 106.

In accordance with at least one embodiment, the mobile location unit 118 may capture and communicate the tracking data from the working entity 116 utilizing any suitable time of flight signal technology between the mobile location unit 118 and the working entity 116. Time of flight signal technology can include any electronic signal technology that can determine the elapsed time period between a transmission of a signal from a source and a return of the signal, or at least a portion thereof, back to the source. Other configurations such as a signal source and signal detector may also be utilized to determine time of flight and distance between source/detector or transmitter/receiver. For example, the elapsed time period between the transmission of a signal from a source to detection of the signal, or at least a portion thereof, at a detector or receiver, along with the known speed of the signal (e.g., the speed of light) may be utilized to determine the distance between the source of the signal and the signal detector. In embodiments, the entity monitoring safety service computers 114 may receive the time of flight information between the mobile location unit 118 and the working entity 116, via the access points 110, and a known speed of the signal to determine the relative distance between the mobile location unit 118 and the working entity 116 at any given time.

As an illustrative example, a radio frequency transmitter associated with the mobile location unit 118 and a radio frequency receiver associated with the working entity 116 may be utilized to send and receive radio frequency signals which can be captured over several cycles to determine distances between the working entity 116 and the mobile location unit 118 based on the time of flight from the transmitter to the receiver and back to the transmitter. However, in some embodiments, the radio frequency signals may be communicated utilizing a radio frequency transmitter that is associated with the working entity 116 and a radio frequency receiver that is associated with the mobile location unit 118. As described herein, a UWB-configured radio may be utilized to determine time of flight information and thus distances between the mobile location unit 118 and working entity 116 within the materials handling facility 106. Further, a number of cycles of transmitting radio frequency signals can be utilized by the entity monitoring safety service computers 114 to determine the speed of the working entity 116 as the time of flight distances can be triangulated to determine the changes in distances over time, and thus the speed, of the working entity 116. In an embodiment, the mobile location unit 118 may be associated with a plurality of radio frequency transmitters/receivers for sending and receiving multiple radio frequency signals and triangulating the received time of flight information to determine the relative location of the working entity 116 respective to the mobile location unit 118. The triangulation of the time of flight information may be performed by the mobile location unit 118 or the entity monitoring safety service computers 114. Other electronic signal time of flight or phase technologies may be utilized to capture the tracking data, as described herein, including ultra-sonic configurations, infrared light or laser transmitter/receiver configurations, a radio frequency link utilizing a wide range of radio frequencies, an invisible light link between the mobile location unit and the working entity, or video tracking, for example.

In embodiments, as the mobile location unit 118 follows the working entity 116, tracking data 120, including at least the location of the working entity 116 relative to the mobile location unit 118, may be captured and communicated 122, via the access point, to the entity monitoring safety service computer(s) 114. In an embodiment, the entity monitoring safety service computer(s) 114 may utilize the respective location information 112 from the one or more mobile drive units 102 and the tracking data 120 from the mobile location unit 118, to generate paths 104 for the plurality of mobile drive units to follow as they move throughout the materials handling facility 106. The entity monitoring safety service computer(s) 114 may provide 124 the generated paths 104 to the one or more mobile drive units 102 effectively creating a no-enter zone 126 around the working entity 116. The one or more mobile drive units 102 may be provided paths that are generated in such a way as to avoid being within a certain radius around the working entity (such as zone 126), yet still allow the one or more mobile drive units 102 to continue moving throughout the materials handling facility 106. In an embodiment, the mobile location unit 118 may be configured to continually provide the tracking data to enable the entity monitoring safety service computer(s) 114 to generate in real time new paths thereby enabling the working entity 116 to access the materials handling facility 106 in relative safety from a mobile drive unit 102 attempting to travel through the same occupied space.

Figure 2:
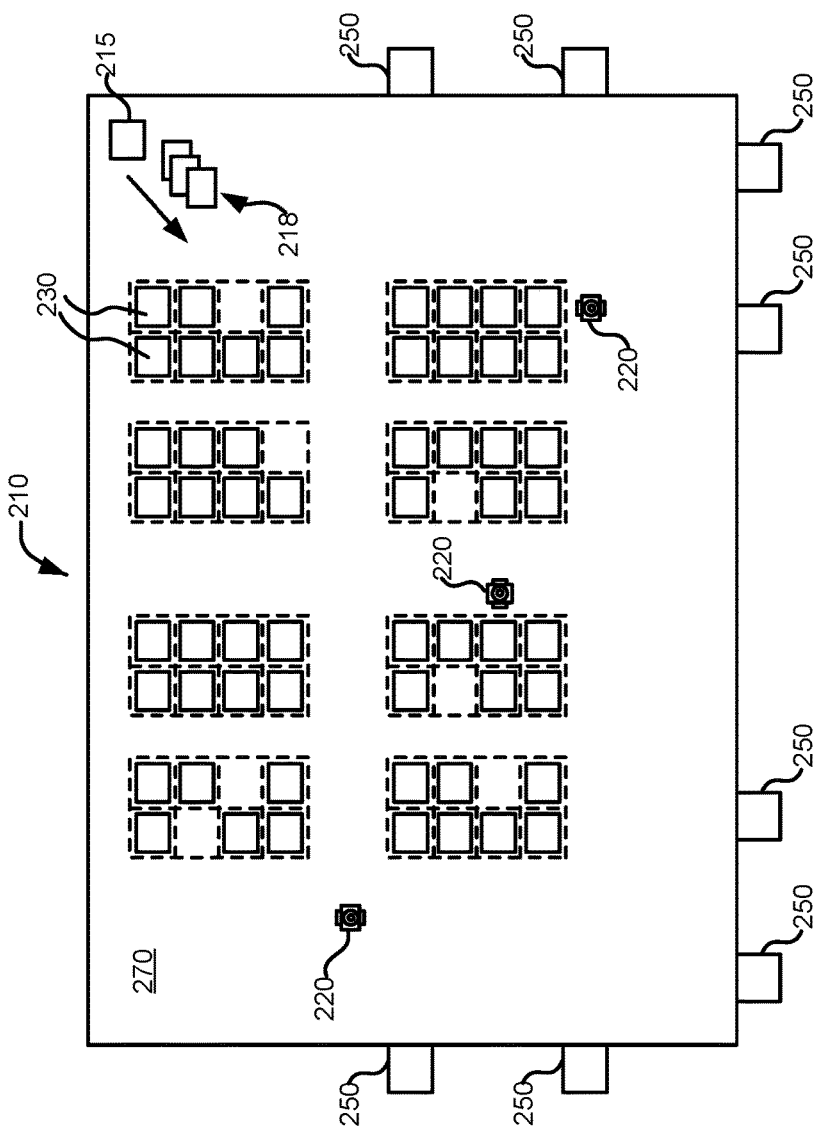
FIG. 2 illustrates components of an entity monitoring safety feature in an inventory management system, in accordance with at least one embodiment.

FIG. 2 illustrates components of an entity monitoring safety feature in an inventory management system, in accordance with at least one embodiment. Examples of such inventory systems are disclosed in U.S. Patent Publication No. 2012/0143427, published on Jun. 7, 2012, titled "SYSTEM AND METHOD FOR POSITIONING A MOBILE DRIVE UNIT" and U.S. Pat. No. 8,280,547, issued on Oct. 2, 2012, titled "METHOD AND SYSTEM FOR TRANSPORTING INVENTORY ITEMS." Inventory management system 210 includes a management module 215, one or more mobile drive units 220, one or more inventory holders 230, and one or more inventory stations 250. Mobile drive units 220 transport inventory holders 230 between points within a workspace 270 in response to commands communicated by management module 215. Each inventory holder 230 stores one or more types of inventory items. As a result, inventory management system 210 is capable of moving inventory items between locations within workspace 270 to facilitate the entry, processing, and/or removal of inventory items from the inventory management system 210 and the completion of other tasks involving inventory items.

Management module 215 assigns tasks to appropriate components of inventory management system 210 and coordinates operation of the various components in completing the tasks. These tasks may relate not only to the movement and processing of inventory items, but also to the management and maintenance of the components of inventory management system 210. For example, management module 215 may assign portions of workspace 270 as parking spaces for mobile drive units 220, the scheduled recharge or replacement of mobile drive unit batteries, the storage of empty inventory holders 230, or any other operations associated with the functionality supported by inventory management system 210 and its various components. Management module 215 may select components of inventory management system 210 to perform these tasks and communicate appropriate commands and/or data to the selected components to facilitate completion of these operations. Although shown in FIG. 2 as a single, discrete component, management module 215 may represent multiple components and may represent or include portions of mobile drive units 220 or other elements of inventory management system 210. As a result, any or all of the interactions between a particular mobile drive unit 220 and management module 215 that are described herein may, in particular embodiments, represent peer-to-peer communication between that mobile drive unit 220 and one or more other mobile drive units 220 or a mobile location unit (not pictured). The contents and operation of an example embodiment of management module 215 which implements the entity monitoring safety feature in an inventory management system are discussed further below with respect to FIGS. 3 and 4.

Mobile drive units 220 move inventory holders 230 between locations within workspace 270. Mobile drive units 220 may represent any devices or components appropriate for use in inventory management system 210 based on the characteristics and configuration of inventory holders 230 and/or other elements of inventory management system 210. In a particular embodiment of inventory management system 210, mobile drive units 220 represent independent, self-powered devices configured to freely move about workspace 270. In alternative embodiments, mobile drive units 220 represent elements of a tracked inventory management system configured to move inventory holder 230 along tracks, rails, cables, crane system, or other guidance or support elements traversing workspace 270. In such an embodiment, mobile drive units 220 may receive power and/or support through a connection to the guidance elements, such as a powered rail. Additionally, in particular embodiments of inventory management system 210 mobile drive units 220 may be configured to utilize alternative conveyance equipment to move within workspace 270 and/or between separate portions of workspace 270.

Additionally, mobile drive units 220 may be capable of communicating with management module 215 to receive information identifying selected inventory holders 230, transmit the locations of mobile drive units 220, or exchange any other suitable information to be used by management module 215 or mobile drive units 220 during operation. Mobile drive units 220 may communicate with management module 215 wirelessly, using access points (not pictured) located within or about the workspace 270 of the inventory management system 210, and/or in any other appropriate manner. As one example, particular embodiments of mobile drive unit 220 may communicate with management module 215 and/or with one another using 802.11, Bluetooth, or Infrared Data Association (IrDA) standards, or any other appropriate wireless communication protocol via the access points. As another example, in a tracked inventory management system 210, tracks or other guidance elements upon which mobile drive units 220 move may be wired to facilitate communication between mobile drive units 220 and other components of inventory management system 210. Furthermore, as noted above, management module 215 may include components of individual mobile drive units 220. Thus, for the purposes of this description, communication between management module 215 and a particular mobile drive unit 220 may represent communication between components of a particular mobile drive unit 220 and an access point transmitting information to the management module 215. In general, mobile drive units 220 may be powered, propelled, and controlled in any manner appropriate based on the configuration and characteristics of inventory management system 210.

Inventory holders 230 store inventory items. In a particular embodiment, inventory holders 230 include multiple storage bins with each storage bin capable of holding one or more types of inventory items. Inventory holders 230 are capable of being carried, rolled, and/or otherwise moved by mobile drive units 220. In particular embodiments, inventory holder 230 may provide additional propulsion to supplement that provided by mobile drive unit 220 when moving inventory holder 230.

Additionally, each inventory holder 230 may include a plurality of faces, and each bin may be accessible through one or more faces of the inventory holder 230. For example, in a particular embodiment, inventory holder 230 includes four faces. In such an embodiment, bins located at a corner of two faces may be accessible through either of those two faces, while each of the other bins is accessible through an opening in one of the four faces. Mobile drive unit 220 may be configured to rotate inventory holder 230 at appropriate times to present a particular face and the bins associated with that face to an operator or other components of inventory management system 210.

Inventory items represent any objects suitable for storage, retrieval, and/or processing in an automated inventory management system 210. For the purposes of this description, "inventory items" may represent any one or more objects of a particular type that are stored in inventory management system 210. Thus, a particular inventory holder 230 is currently "storing" a particular inventory item if the inventory holder 230 currently holds one or more units of that type. As one example, inventory management system 210 may represent a mail order warehouse facility, and inventory items may represent merchandise stored in the warehouse facility. During operation, mobile drive units 220 may retrieve inventory holders 230 containing one or more inventory items requested in an order to be packed for delivery to a customer or inventory holders 230 carrying pallets containing aggregated collections of inventory items for shipment. Moreover, in particular embodiments of inventory management system 210, boxes containing completed orders may themselves represent inventory items.

In particular embodiments, inventory management system 210 may also include one or more inventory stations 250. Inventory stations 250 represent locations designated for the completion of particular tasks involving inventory items. Such tasks may include the removal of inventory items from inventory holders 230, the introduction of inventory items into inventory holders 230, the counting of inventory items in inventory holders 230, the decomposition of inventory items (e.g., from pallet- or case-sized groups to individual inventory items), the consolidation of inventory items between inventory holders 230, and/or the processing or handling of inventory items in any other suitable manner. In particular embodiments, inventory stations 250 may just represent the physical locations where a particular task involving inventory items can be completed within workspace 270. In alternative embodiments, inventory stations 250 may represent both the physical location and also any appropriate equipment for processing or handling inventory items, such as scanners for monitoring the flow of inventory items in and out of inventory management system 210, communication interfaces for communicating with management module 215, and/or any other suitable components. Inventory stations 250 may be controlled, entirely or in part, by entity operators or may be fully automated. Moreover, the entity or automated operators of inventory stations 250 may be capable of performing certain tasks to inventory items, such as packing, counting, or transferring inventory items, as part of the operation of inventory management system 210.

Workspace 270 represents an area associated with inventory management system 210 in which mobile drive units 220 can move and/or inventory holders 230 can be stored. For example, workspace 270 may represent all or part of the floor of a mail-order warehouse in which inventory management system 210 operates. Although FIG. 2 shows, for the purposes of illustration, an embodiment of inventory management system 210 in which workspace 270 includes a fixed, predetermined, and finite physical space, particular embodiments of inventory management system 210 may include mobile drive units 220 and inventory holders 230 that are configured to operate within a workspace 270 that is of variable dimensions and/or an arbitrary geometry. While FIG. 2 illustrates a particular embodiment of inventory management system 210 in which workspace 270 is entirely enclosed in a building, alternative embodiments may utilize workspaces 270 in which some or all of the workspace 270 is located outdoors, within a vehicle (such as a cargo ship), or otherwise unconstrained by any fixed structure.

In operation, management module 215 selects appropriate components to complete particular tasks and transmits task assignments 218 to the selected components to trigger completion of the relevant tasks. Each task assignment 218 defines one or more tasks to be completed by a particular component. These tasks may relate to the retrieval, storage, replenishment, and counting of inventory items and/or the management of mobile drive units 220, inventory holders 230, inventory stations 250, and other components of inventory management system 210. Depending on the component and the task to be completed, a particular task assignment 218 may identify locations, components, and/or actions associated with the corresponding task and/or any other appropriate information to be used by the relevant component in completing the assigned task.

In particular embodiments, management module 215 generates task assignments 218 based, in part, on inventory requests that management module 215 receives from other components of inventory management system 210 and/or from external components in communication with management module 215. These inventory requests identify particular operations to be completed involving inventory items stored or to be stored within inventory management system 210 and may represent communication of any suitable form. For example, in particular embodiments, an inventory request may represent a shipping order specifying particular inventory items that have been purchased by a customer and that are to be retrieved from inventory management system 210 for shipment to the customer. Management module 215 may also generate task assignments 218 independently of such inventory requests, as part of the overall management and maintenance of inventory management system 210. For example, management module 215 may generate task assignments 218 in response to the occurrence of a particular event (e.g., in response to a mobile drive unit 220 requesting a space to park), according to a predetermined schedule (e.g., as part of a daily start-up routine), or at any appropriate time based on the configuration and characteristics of inventory management system 210. After generating one or more task assignments 218, management module 215 transmits the generated task assignments 218 to appropriate components for completion of the corresponding task. The relevant components then execute their assigned tasks.

With respect to mobile drive units 220 specifically, management module 215 may, in particular embodiments, communicate task assignments 218 to selected mobile drive units 220 that identify one or more destinations for the selected mobile drive units 220. Management module 215 may select a mobile drive unit 220 to assign the relevant task based on the location or state of the selected mobile drive unit 220, an indication that the selected mobile drive unit 220 has completed a previously-assigned task, a predetermined schedule, and/or any other suitable consideration. These destinations may be associated with an inventory request the management module 215 is executing or a management objective the management module 215 is attempting to fulfill. For example, the task assignment may define the location of an inventory holder 230 to be retrieved, an inventory station 250 to be visited, a storage location where the mobile drive unit 220 should park until receiving another task, or a location associated with any other task appropriate based on the configuration, characteristics, and/or state of inventory management system 210, as a whole, or individual components of inventory management system 210. For example, in particular embodiments, such decisions may be based on the popularity of particular inventory items, the staffing of a particular inventory station 250, the tasks currently assigned to a particular mobile drive unit 220, and/or any other appropriate considerations.

While the appropriate components of inventory management system 210 complete assigned tasks, management module 215 may interact with the relevant components to ensure the efficient use of space, equipment, manpower, and other resources available to inventory management system 210. As one specific example of such interaction, management module 215 is responsible, in particular embodiments, for planning the paths mobile drive units 220 take when moving within workspace 270 and for allocating use of a particular portion of workspace 270 to a particular mobile drive unit 220 for purposes of completing an assigned task. In such embodiments, mobile drive units 220 may, in response to being assigned a task, request a path to a particular destination associated with the task. Moreover, while the description below focuses on one or more embodiments in which mobile drive unit 220 requests paths from management module 215, mobile drive unit 220 may, in alternative embodiments, generate its own paths.

Components of inventory management system 210 may provide information to management module 215 regarding their current state, other components of inventory management system 210 with which they are interacting, and/or other conditions relevant to the operation of inventory management system 210. This may allow management module 215 to utilize feedback from the relevant components to update algorithm parameters, adjust policies, or otherwise modify its decision-making to respond to changes in operating conditions or the occurrence of particular events. For example, mobile drive unit 220 may provide network traffic information associated with the access points to the management module 215 for use in embodiments described herein.

In addition, while management module 215 may be configured to manage various aspects of the operation of the components of inventory management system 210, in particular embodiments, the components themselves may also be responsible for decision-making relating to certain aspects of their operation, thereby reducing the processing load on management module 15.

As used herein, the phrase "access points" includes devices that act as transmitters and receivers of local area wireless network signals (e.g., "Wi-Fi", Long Term Evolution (LTE), Bluetooth, WirelessHD and WiGig, and Z-Wave). Location information may include the ID of the mobile drive unit/mobile location unit, X, Y and Z coordinates of the mobile drive unit/mobile location unit in an inventory management system, a timestamp from when the mobile drive unit/mobile location unit sent the information to the computer system, roam time between access points (the time period for the mobile drive unit to successfully switch from one access point to another within the inventory management system), received signal strength indicators, timeouts that occur when at least one mobile drive unit switches from one access point to another, beacons from the access points, and/or bitrates. As used herein, the phrase "autonomous vehicle" may include a unit that is capable of moving within the inventory management system workspace and may include any appropriate components for propelling itself and navigating to a particular destination within the inventory management system workspace. The autonomous vehicle may also be capable of gathering and sending information about the inventory management system's network connectivity. A mobile drive unit/mobile location unit may be a type of autonomous vehicle, in particular, an autonomous ground vehicle. As used herein, the phrase "timestamp" may include information about the time and/or date when information was received by or transmitted from the mobile drive unit/mobile location unit. As used herein, the phrases "beacon" or "beacon information" may include information indicating the frequency with which an access point announces its presence to surrounding mobile drive units/mobile location units.

Figure 3:
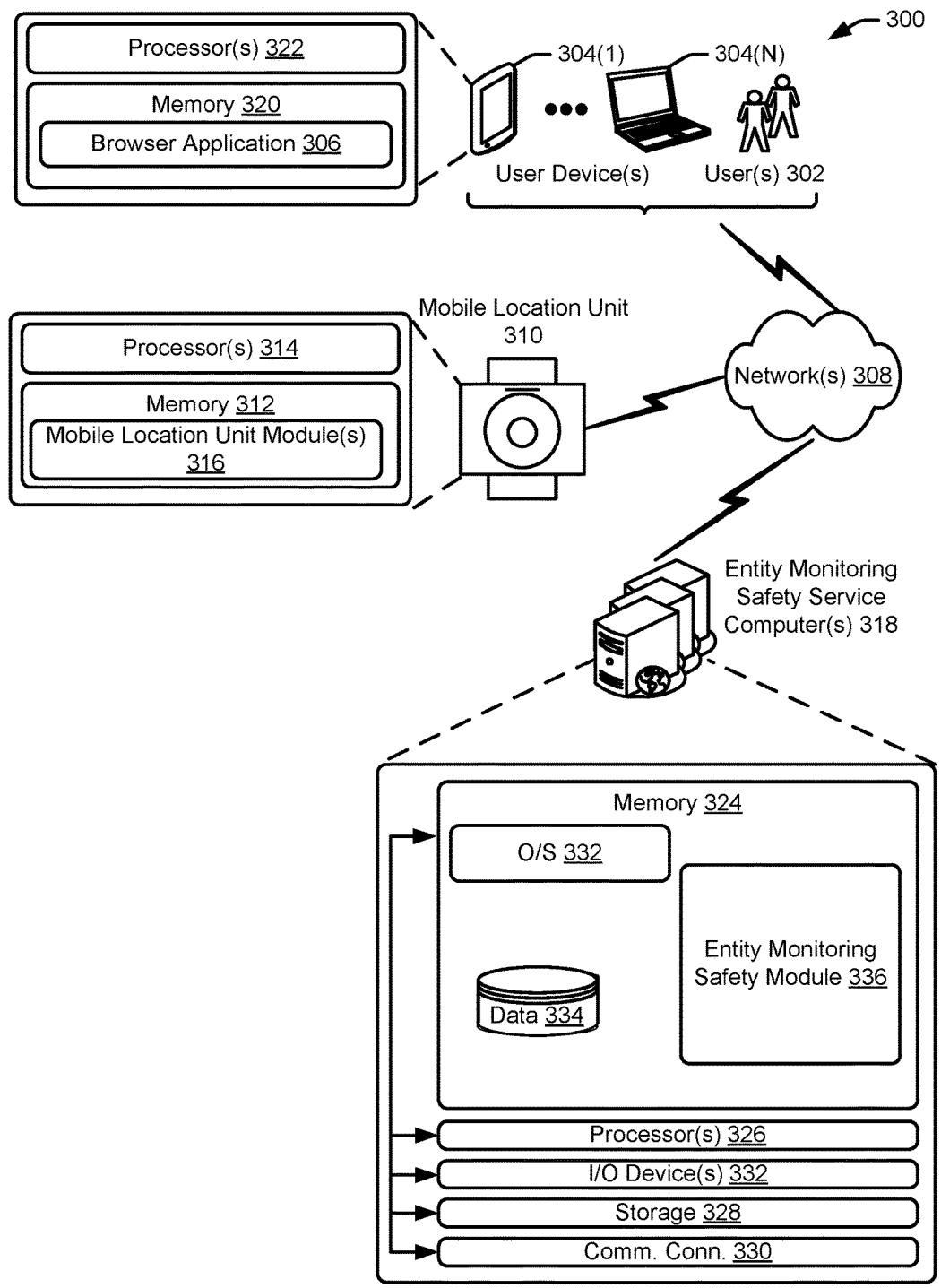
FIG. 3 illustrates an example architecture for an entity monitoring safety feature in an inventory management system as described herein that includes one or more service provider computer(s) and/or a user device connected via one or more networks, in accordance with at least one embodiment.

FIG. 3 illustrates an example architecture for an entity monitoring safety feature in an inventory management system as described herein that includes one or more service provider computer(s) and/or a user device connected via one or more networks, in accordance with at least one embodiment. In architecture 300, one or more users 302 (e.g., inventory management system administrators or working entities associated with the inventory management system) may utilize user computing devices 304(1)-(N) (collectively, user devices 304) to access a browser application 306 or a user interface (UI) accessible through the browser application 306, via one or more networks 308 to request access to the inventory management system and/or materials handling facility, and provide input regarding generated paths for enabling safety of the accessing entity as described herein. The "browser application" 306 can be any browser control or native application that can access and display a network page or other information. A native application may include an application or program that has been developed for use on a particular platform (such as an operating system) or a particular device (such as a particular type of mobile device).

In accordance with at least one embodiment, the user devices 304 may be configured with the signal transmitter and/or receiver, as described herein, for communicating the tracking data with the mobile location unit 310. In embodiments, the signal transmitter and/or receiver may be included in a standalone, dedicated device, a wearable device (such as a lanyard, necklace, bracelet, ring, etc.), or an article of clothing (such as a hat, glove, vest, etc.). The dedicated, wearable, or article of clothing devices may include memory and processors similar to the memory 320 and processors 322 of the user devices 304 for implementing aspects of the entity monitoring safety feature in the inventory management system. Each type of device (dedicated, wearable, or article of clothing) may utilize any signal provider and/or detection configuration or any receiver or transmitter configuration described herein as appropriate given the nature of the device to communicate with the mobile location unit 310. For example, wearable device embodiments may utilize a UWB receiver/transmitter configuration while an article of clothing may utilize a camera image capture/transmitter configuration to communicate with the mobile location unit 310.

The architecture 300 may also include a mobile location unit 310 that may be configured to physically track, move within a bounded area around, and/or capture tracking data of a working entity accessing the inventory management system, as described herein. In embodiments, the mobile location unit 310 may be an example of a mobile drive unit as described herein. The mobile location unit 310 may include at least one memory 312 and one or more processing units or processor(s) 314. The memory 312 may store program instructions that are loadable and executable on the processor(s) 314, as well as data generated during the execution of these programs. Depending on the configuration and type of mobile location unit 310, the memory 312 may be volatile (such as random access memory (RAM)) and/or non-volatile (such as read-only memory (ROM), flash memory, etc.). The mobile location unit 310 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the mobile location unit 310. In some implementations, the memory 312 may include multiple different types of memory, such as static random access memory (SRAM), dynamic random access memory (DRAM), or ROM.

Turning to the contents of the memory 312 in more detail, the memory 312 may include an operating system and one or more application programs or services for implementing the features disclosed herein. Additionally, the memory 312 may include one or more mobile location unit modules 316 for implementing the features described herein such as a location information module, a tracking data module, or a pathway module as described in more detail below in FIG. 4. For example, the mobile location unit modules 316 may be configured to obtain tracking data that indicates the relative location of a working entity with respect to the mobile location unit 310 as the mobile location unit moves within a bounded area around the working entity by utilizing a sensor/detector or receiver/transmitter configuration as described above. Further, the mobile location unit modules 316 may be configured to read and/or scan fiducial markings or barcodes within the inventory management system to aid the one or more service provider computers 316 in determining the location of the mobile location unit 310 within an inventory management system. The mobile location unit modules 316 may be configured to utilize the location information and tracking data to generate new paths for one or more mobile drive units within the inventory management system that instruct the mobile drive units to avoid the working entity that is being followed. The mobile location unit 310 may also include geo-location devices (e.g., a global positioning system (GPS) device or the like) for providing and/or recording geographic location information associated with the mobile location unit 310. In embodiments, the mobile location unit 310 may also utilize other sensor technologies for determining location information such as imaging devices, scanners, radio frequency identification (RFID) readers that are configured to read fiducial markings, barcodes, RFID tags, or other identifiers from the surrounding environment (such as markings or identifiers located on inventory holders 230 within the inventory management system 270 of FIG. 2) to determine their own location.

The architecture 300 may also include one or more service provider computers 318 that may, in some examples, provide computing resources such as, but not limited to, client entities, low latency data storage, durable data storage, data access, management, virtualization, hosted computing environment or "cloud-based" solutions, electronic content performance management, etc. The one or more service provider computers 318 may implement or be an example of the entity monitoring safety service computer(s) 114 or the management module 215 of FIGS. 1 and 2. The one or more service provider computers 318 may also be operable to provide site hosting, computer application development, and/or implementation platforms, combinations of the foregoing, or the like to the one or more users 302.

In one illustrative configuration, the user computing devices 304 may include at least one memory 320 and one or more processing units or processor(s) 322. The processor(s) 322 may be implemented as appropriate in hardware, computer-executable instructions, firmware, or combinations thereof. Computer-executable instruction or firmware implementations of the processor(s) 322 may include computer-executable or machine-executable instructions written in any suitable programming language to perform the various functions described herein. The user devices 304 may also include geo-location devices (e.g., a global positioning system (GPS) device or the like) for providing and/or recording geographic location information associated with the user devices 304. The memory 320 may store program instructions that are loadable and executable on the processor(s) 322, as well as data generated during the execution of these programs. Depending on the configuration and type of user device 304, the memory 320 may be volatile (such as random access memory (RAM)) and/or non-volatile (such as read-only memory (ROM), flash memory, etc.). The user device 304 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 320 may include multiple different types of memory, such as static random access memory (SRAM), dynamic random access memory (DRAM), or ROM.

Turning to the components of the memory 320 in more detail, the memory 320 may include an operating system and one or more application programs or services for implementing the features disclosed herein. Additionally, the memory 320 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user provided response to a security question or a geographic location obtained by the user device 304.

In some examples, the networks 308 may include any one or a combination of many different types of networks, such as cable networks, the Internet, wireless networks, cellular networks and other private and/or public networks. While the illustrated example represents the users 302 communicating with the service provider computers 318 over the networks 308, the described techniques may equally apply in instances where the users 302 interact with the one or more service provider computers 318 via the one or more user devices 304 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The browser application 306 may be capable of handling requests from many users 302 and serving, in response, various user interfaces that can be rendered at the user devices 304 such as, but not limited to, a network site or network page. The browser application 306 can interact with any type of network site that supports user interaction, including social networking sites, electronic retailers, informational sites, blog sites, search engine sites, news and entertainment sites, electronic marketplaces, and so forth. The described techniques can similarly be implemented outside of the browser application 306, such as with other applications running on the user device 304.

The one or more service provider computers 318 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 318 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 318 may be in communication with the user device 304 via the networks 308, or via other network connections. The one or more service provider computers 318 may include one or more servers, perhaps arranged in a cluster or as individual servers not associated with one another.

In one illustrative configuration, the one or more service provider computers 318 may include at least one memory 324 and one or more processing units or processors(s) 326. The processor(s) 326 may be implemented as appropriate in hardware, computer-executable instructions, firmware, or combinations thereof. Computer-executable instruction or firmware implementations of the processor(s) 326 may include computer-executable or machine-executable instructions written in any suitable programming language to perform the various functions described when executed by a hardware computing device, such as a processor.

The memory 324 may store program instructions that are loadable and executable on the processor(s) 326, as well as data generated during the execution of these programs. Depending on the configuration and type of the one or more service provider computers 318, the memory 324 may be volatile (such as RAM) and/or non-volatile (such as ROM, flash memory, etc.). The one or more service provider computers 318 or servers may also include additional storage 328, which may include removable storage and/or non-removable storage. The additional storage 328 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 324 may include multiple different types of memory, such as SRAM, DRAM, or ROM.

The memory 324, the additional storage 328, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 324 and the additional storage 328 are all examples of non-transitory computer storage media. Additional types of non-transitory computer storage media that may be present in the one or more service provider computers 318 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 318. Combinations of any of the above should also be included within the scope of non-transitory computer-readable media.

The one or more service provider computers 318 may also contain communication connection interface(s) 330 that allow the one or more service provider computers 318 to communicate with a data store, another computing device or server, user terminals and/or other devices on the networks 308. The one or more service provider computers 318 may also include I/O device(s) 332, such as a keyboard, a mouse, a pen, a voice input device, a touch input device, a display, speakers, a printer, etc.

Turning to the contents of the memory 324 in more detail and as will be described in further detail in FIG. 4, the memory 324 may include an operating system 332, one or more data stores 334, and/or one or more application programs or services for implementing the features disclosed herein including the entity monitoring safety module 336. In accordance with at least one embodiment, the entity monitoring safety module 336 may be configured to at least maintain location information for a plurality of mobile devices that are configured to move within an inventory management system, receive tracking data from a mobile location unit that indicates a location of a working entity relative to the mobile location unit, within the inventory management system, generate and provide instructions to the plurality of mobile drive units enabling the working entity to access the inventory management system safely by, for example, altering paths of the plurality of mobile drive units or instructing the plurality of mobile drive units to stop moving within a portion of the inventory management system.

Figure 4:
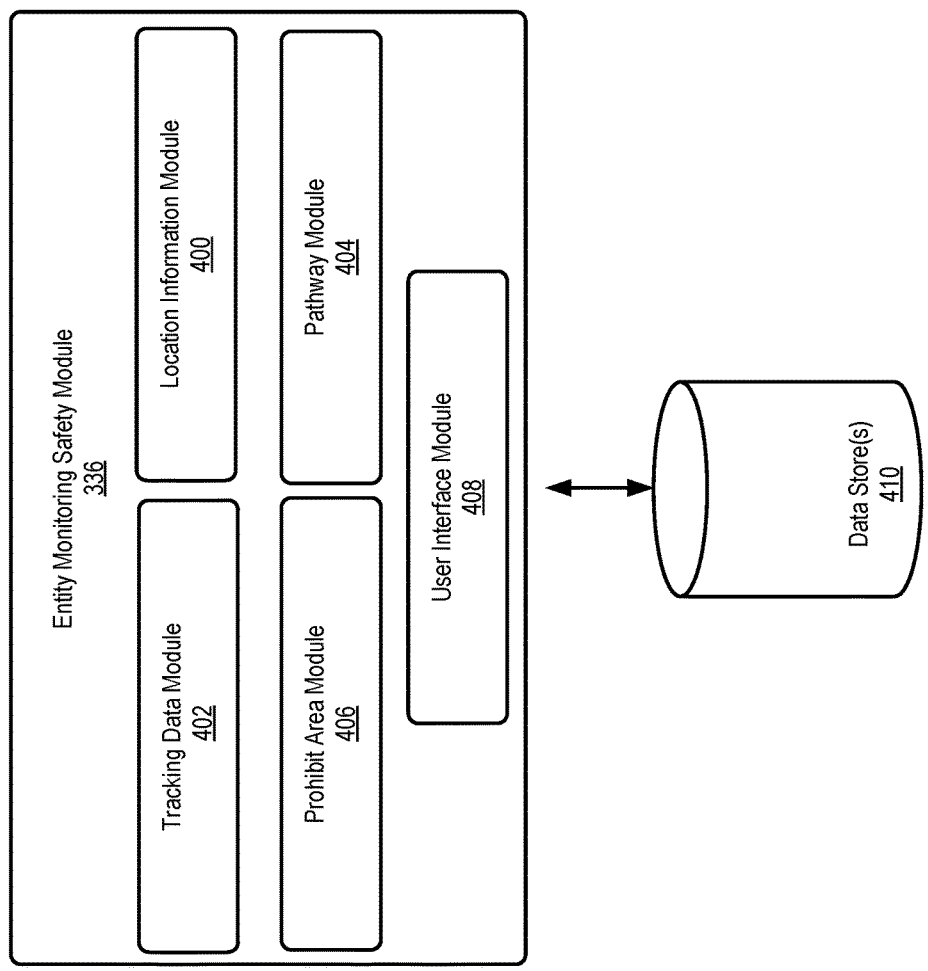
FIG. 4 illustrates an example entity monitoring safety module, in accordance with at least one embodiment.

FIG. 4 illustrates an example entity monitoring safety module, according to embodiments. It should be noted that while multiple modules are described in the example entity monitoring safety module 336, the processes and methods described herein can be performed by more or less modules within memory such as memory 324 described above. In addition, while the modules 400-408 included in the entity monitoring safety module 336 are displayed and described as distinct modules, in some embodiments they may be included within one another or otherwise combined to further facilitate methods and systems described herein. In accordance with at least one embodiment, the entity monitoring safety module 336 may include a location information module 400, a tracking data module 402, a pathway module 404, a prohibit area module 406, and a user interface module 408 in communication with one or more data stores 410 (which is an example of the one or more data stores 334 from FIG. 3).

In accordance with at least one embodiment, the location information module 400 may be configured to receive and maintain location information/data, via the access points, from a plurality of mobile drive units in the inventory management system. In an embodiment, the location information module 400 may provide the maintained location information to one or more other modules, such as the pathway module 404 or prohibit area module 406 for enabling safe access of a working entity to a materials handling facility or inventory management system. In embodiments, the location information module 400 may receive the location information periodically or it may receive the location information in real time, depending on configurations of the mobile drive units. The location information maintained by the location information module 400 may be provided to the user interface module 408 for generating and providing for presentation a user interface that indicates respective locations of the plurality of mobile drive units in the inventory management system at any given time. In an embodiment, the location information module 400 may receive and maintain location information for one or more mobile location units for use by the pathway module 404 or prohibit area module 406 in generating new/alternate paths for the plurality of mobile drive units.

In accordance with at least one embodiment, the tracking data module 402 may be configured to receive and maintain, via access points, tracking data from one or more mobile location units as the mobile location units stay within a bounded area around the working entity. In embodiments, the tracking data may be received periodically or in real time depending on the configurations of the mobile location units. In an embodiment, the tracking data may include the location of a working entity respective to the location of the mobile location unit, direction of the working entity, moving speed of the working entity, or any other suitable information that can be captured by following and tracking a working entity moving throughout the inventory management system. The tracking data module 402 may provide the tracking data to the pathway module 404 and prohibit area module 406 for enabling safe access to the inventory management system by a working entity. The tracking data may be provided to the user interface module 408 for generating and providing for presentation a user interface that indicates respective locations of one or more working entities within the inventory management system at any given time. The tracking data module 402 may be configured to transform the received tracking data into a uniform format for use by the pathway module 404 and prohibit area module 406. For example, tracking data received from a mobile location unit outfitted with a UWB radio may require transformation to a four quadrant space for use by the pathway module 404 and prohibit area module 406.

In accordance with at least one embodiment, the pathway module 404 may use the location information and the tracking data to generate new paths for the plurality of mobile drive units to use when moving within the inventory management system. The new paths may be different from the current paths that are being used by the plurality of mobile drive units. Further, the new paths may avoid a bounded area around the working entity that is accessing the inventory management system effectively creating a safe zone for the working entity to work without any mobile drive units attempting to move through a currently occupied space. In embodiments, the pathway module 404 may generate the new paths in real time to account for the working entity moving throughout the inventory management system and to provide the new paths to the plurality of mobile drive units to alter their movement path on the fly to ensure the safety of the working entity.

The pathway module 404 may utilize portions of the tracking information, such as the working entity's movement speed, to alter or generate new paths for the plurality of mobile drive units in the inventory management system. In embodiments, the pathway module 404 may calculate an expanded radius around the working entity, utilizing the tracking data from a mobile location unit that is in communication with the working entity, in order to keep the plurality of mobile drive units away from the working entity. Thus, the new paths allow for relatively safe access by the working entity and continued operation by the plurality of mobile drive units within the inventory management system without having to shut down all moving mobile drive units each time a working entity requests access to the inventory management system. The pathway module 404 may provide the new paths to the plurality of mobile drive units and the mobile location unit via the access points situated around the inventory management system. The pathway module 404 may generate pathway information for one or more mobile location units to create a path for the working entity to utilize that takes into account the current location of the plurality of mobile drive units and their movement path thereby creating a safe passage for the working entity to follow utilizing the one or more mobile location units. In accordance with at least one embodiment, the pathway module 404 may provide instructions to the plurality of mobile drive units to decrease their speed to a speed that would enable safe passage by the working entity to the inventory management system. For example, instructions may be provided that indicate the speed of the mobile drive units should be reduced to 0.25 meters per second or less. In some embodiments, instructions to decrease speed can be in accordance with guidelines provided by the international standards organization (ISO), the automated guided vehicle system (AGVS) organization, or any other known organizations.

In accordance with at least one embodiment, the prohibit area module 406 may be configured to use the location information and tracking data to provide instructions to shut down or slow the movement of mobile drive units within a portion of the inventory management system. For example, if the tracking data from a mobile location unit indicates that the working entity is currently located within a particular section of the inventory management system, the prohibit area module 406 may provide instructions to the plurality of mobile drive units in the particular section to slow down or stop moving to ensure the safety of the working entity. The slow or safe speed provided to the mobile drive units can be determined by an inventory management system administrator or based on various algorithms that utilize metrics obtained from the location information and tracking data described herein to calculate a safe/slow speed. The prohibit area module 406 may be configured to provide fail safe functionality. For example, the location information or tracking data may indicate that either a mobile drive unit has lost connection from an access point, a mobile location unit has lost connection to the access point or from the working entity (such as the working entity moving a certain distance away from the mobile location unit). In response, the prohibit area module 406 may provide instructions, via the access points, that shut down all mobile drive units in the inventory management system. The instruction to shut down all mobile drive units may only need to occur until the mobile location unit has regained connection with the working entity. In an embodiment, the prohibit area module 406 may mark particular areas of the inventory management system as amnesty areas which the plurality of mobile drive units are to avoid, utilizing paths generated by the pathway module 404 to enable safe access by the working entity to the inventory management system. Further, should a mobile drive unit enter an amnesty area, the respective location indicating as much, the prohibit area module 406 may provide instructions to shut down the movement of that particular offending mobile drive unit. The pathway module 404 may utilize information, including location and size of the amnesty area, to generate paths for the plurality of mobile drive units that avoid entering the amnesty area.

In accordance with at least one embodiment, the user interface module 408 may be configured to receive a request to access the inventory management system. For example, a user (user 302) may access a user interface (UI) provided on a user device (304) to request access to the inventory management system. In response, the entity monitoring safety module 336 may assign a mobile location unit (such as mobile location unit 310) to physically follow and track the movement of the working entity as they access the inventory management system. The entity monitoring safety module 336 may maintain availability information for mobile location units and may determine whether a mobile location unit is available by utilizing the location information and any received tracking data from a particular mobile location unit. In embodiments, the available mobile location units may be parked or reside in a staging area whose corresponding location information indicates that they are available for assignment to a working entity seeking access to the inventory management system. As described above, the user interface module 408 may provide, via a UI that displays current locations and paths for the plurality of mobile drive units, the location and paths for one or more mobile location units that are following and tracking movement of a working entity. Administrators or users of the inventory management system may utilize the UI to provide further instructions to the mobile drive units or the mobile location units to aid in the generation of new paths, mark amnesty areas, prohibited areas, or any other functionality described herein that relates to the entity monitoring safety feature in an inventory management system. For example, the user may activate a manual override shutdown to provide instructions to shut down the movement of all mobile drive units and mobile location units.

Figure 5:
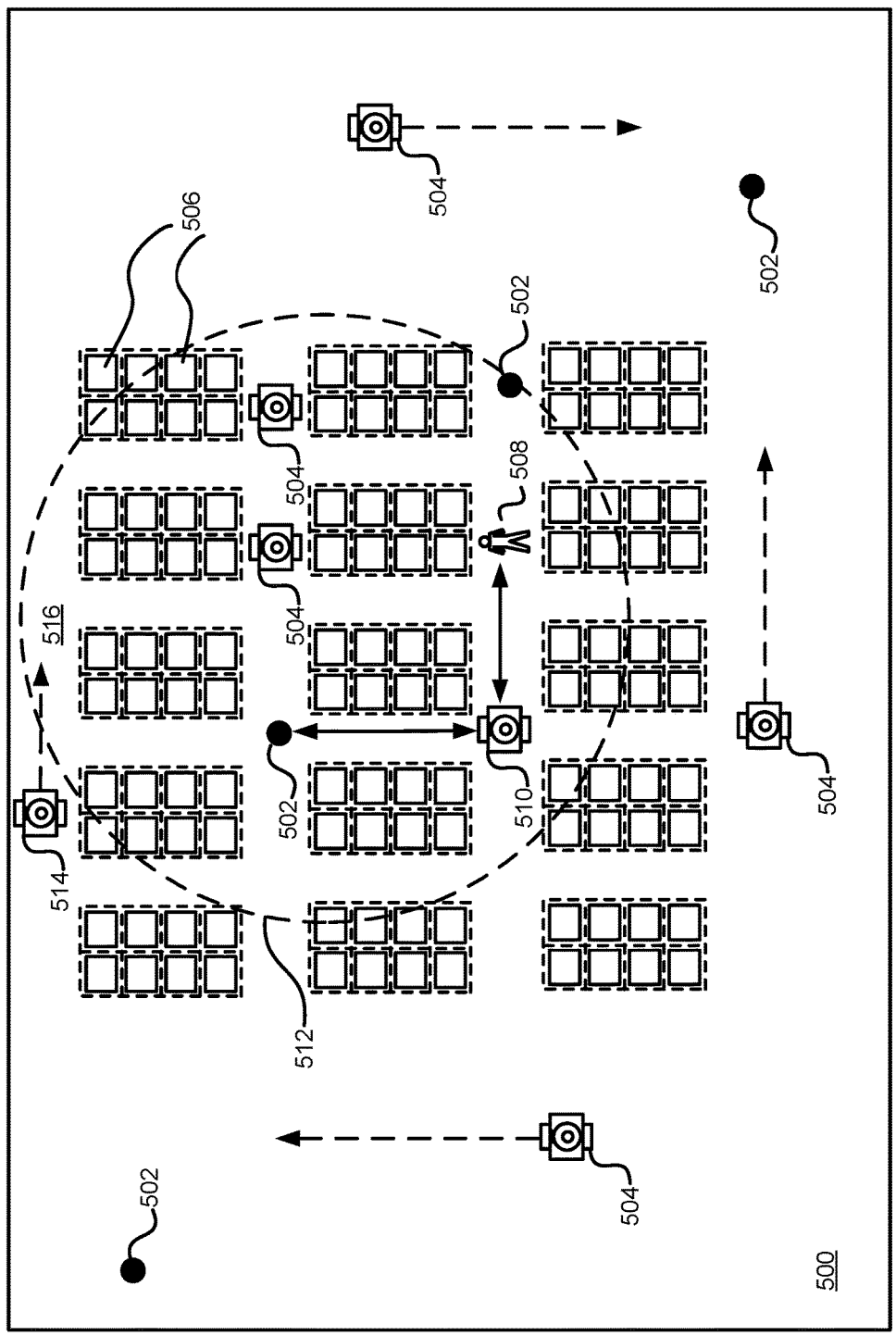
FIG. 5 illustrates an example workflow of an entity monitoring safety feature in an inventory management system, in accordance with at least one embodiment.

FIG. 5 illustrates an example workflow of an entity monitoring safety feature in an inventory management system, in accordance with at least one embodiment. FIG. 5 illustrates an inventory management system 500 that includes one or more access points 502, a plurality of mobile drive units 504, inventory holders 506, and a working entity 508 followed and tracked by a mobile location unit 510. In FIG. 5 the dashed arrows represent travel paths of the mobile drive units 504 and the non-dashed arrows represent communication of information between entities, such as between the mobile location unit 510, a working entity 508, and an access point 502. In some embodiments, the working entity 508 may follow the mobile location unit 510 through the inventory management system 500 to ensure safe passage. For example, the mobile location unit 510 may be provided instructions or paths generated by one or more computers implementing the entity monitoring safety feature described herein. The generated paths may allow the mobile location unit 510 and the working entity 508 to travel in the inventory management system 500 and avoid the plurality of mobile drive units 504 thus ensuring the safety of the working entity 508. The tracking data captured by the mobile location unit 510 may indicate when the working entity 508 has stopped following the mobile location unit 510 or strayed a certain distance from the mobile location unit 510. In response to such tracking data path information, stop movement instructions may be sent to the plurality of mobile drive units 504 to ensure the safety of the working entity 508 or other failsafe operations may occur until the mobile location unit 510 has obtained the relative location of the working entity 508. In an embodiment, stop movement instructions can include the transmission of specific instructions to the plurality of mobile drive units 504 or the mobile location unit 510 to stop all movement, or, in some instances, the omission or termination of the transmission of movement instructions to the plurality of mobile drive units 504 or the mobile location unit 510.

In an embodiment, a computer system (such as service provider computer 310) may provide instructions, via the access points 502, to shut down all mobile drive units within a bounded area 512 around the working entity 508 using location information from the plurality of mobile drive units 504, the mobile location unit 510, and the tracking data from the mobile location unit 510. For example, FIG. 5 illustrates the mobile location unit 510 communicating, via an access point 502, tracking data received from the working entity 508 to a computer system implementing the entity monitoring safety feature. In response, a bounded area 512 for mobile drive units to avoid is created around the working entity by providing instructions via access points 502 to shut down movement of all mobile drive units within the area 512. Further, a mobile drive unit that attempts to enter a prohibited area, such as mobile drive unit 514 may be provided instructions to stop moving 516 by a computer system implementing the entity monitoring safety feature described herein. Thus, FIG. 5 illustrates some mobile drive units 504 continuing to move within the inventory management system 500, while other mobile drive units 504 have stopped moving to enable the working entity 508 to access the inventory management system 500 safely. As described above, in an embodiment, new paths generated by the computer system implementing the entity monitoring safety feature may be provided, via the access points 502, to the plurality of mobile drive units 504 that enable the mobile drive units 504 to avoid the bounded area 512 thereby creating a safe zone for the working entity 508 and enabling the mobile drive units 504 to continue working.

Figure 6:
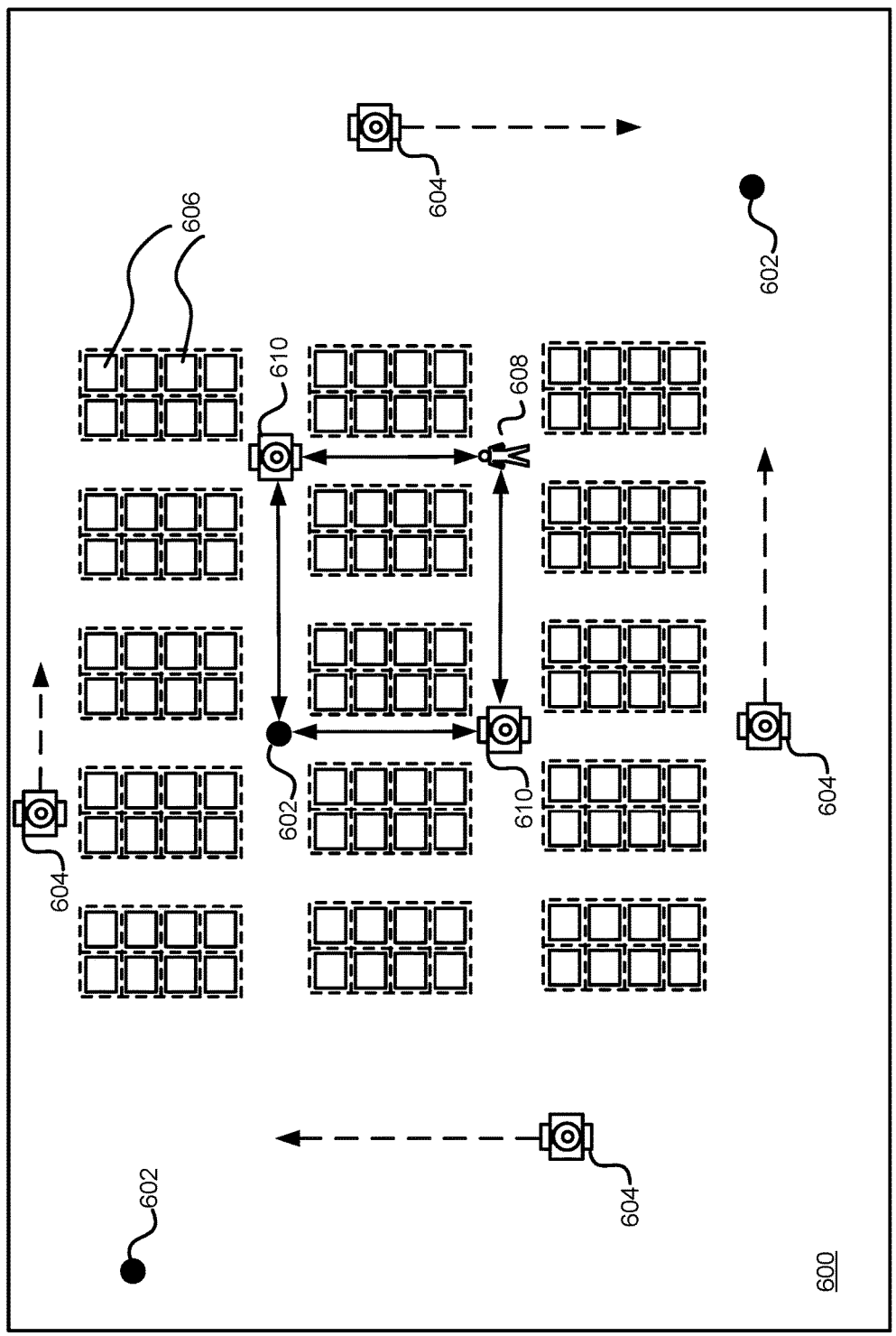
FIG. 6 illustrates an example workflow of an entity monitoring safety feature in an inventory management system, in accordance with at least one embodiment.

FIG. 6 illustrates an example workflow of an entity monitoring safety feature in an inventory management system, in accordance with at least one embodiment. FIG. 6 illustrates an inventory management system 600 that includes one or more access points 602, a plurality of mobile drive units 604, inventory holders 606, and a working entity 608. In FIG. 6 the dashed arrows represent travel paths of the mobile drive units 604 and the non-dashed arrows represent communication of information between entities, such as between the mobile drive unit 610, a working entity 608, and an access point 602. FIG. 6 illustrates an embodiment that does not utilize a mobile location unit but instead leverages the plurality of mobile drive units 604 to provide tracking data from the working entity and create alternative paths and generate no enter zones around the working entity 608. The mobile drive units 604 may be configured to utilize similar technology or features that the mobile location units utilize, as described herein, for communicating tracking data about the working entity 608. Thus, each mobile drive unit 604 may effectively be capable of acting like a mobile location unit without specifically being assigned to follow and capture tracking data about the working entity 608 as they move throughout the inventory management system 600. For example, mobile drive units, such as mobile drive units 610, may receive an indication that a working entity has been detected within a certain distance from the mobile drive unit 610. The mobile drive units 610 may be configured to receive tracking data from a working entity 608 that is captured during their movements throughout the inventory management system 600. The tracking data may be communicated to a computer system that implements the entity monitoring safety feature for generating new paths for the mobile drive units 604 to avoid the working entity 608, for creating a safe or no enter zone around working entity 608, or for providing instructions for all nearby mobile drive units 610 (mobile drive units within a radius distance from the working entity 608) to stop moving or slow down. FIG. 6 illustrates an embodiment where the particular mobile drive units 610 have been provided instructions to stop moving because they are near (within a distance radius) a working entity 608 thereby ensuring safe access by the working entity 608 to the inventory management system 600.

In embodiments mobile drive units 604, 610 and mobile location units (not pictured in FIG. 6) may be configured to utilize various technologies to capture tracking data from a working entity 608 in an inventory management system. For example, tracking data may be captured by utilizing a UWB radio transmitter/receiver combination, infrared light or laser transmitter/receiver, a radio frequency link utilizing a wide range of radio frequencies, an invisible light link between the mobile location unit and the working entity, video tracking or sound or ultrasonic tracking between the mobile location unit and the working entity. In embodiments, either the mobile location unit, mobile drive unit, or working entity may be coupled or configured to utilize either the transmitter or receiver in any of the technologies described herein. For example, the working entity may be coupled to an infrared light pulse transmitter while the mobile location unit/mobile drive units are outfitted with an infrared light receiver for capturing the distance and relative location of the working entity respective to themselves. Further, certain technologies are capable of providing more detailed information such as speed and direction of the working entity. Technologies that are not capable of providing such detailed information may provide all available tracking data and any other information may be calculated or generated by the computer system implementing the entity monitoring safety feature utilizing appropriate algorithms where appropriate.

Figure 7:
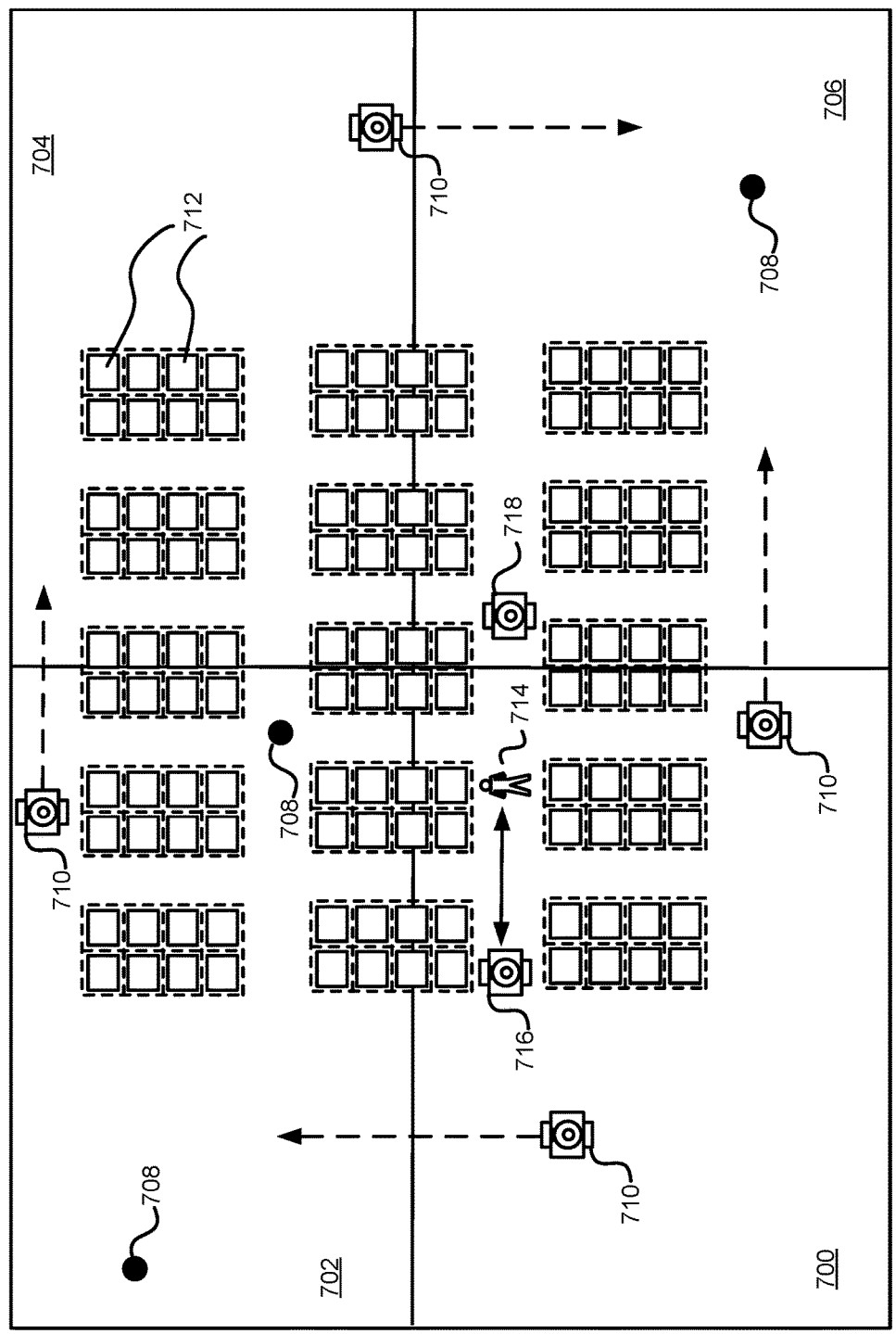
FIG. 7 illustrates an example workflow of an entity monitoring safety feature in an inventory management system, in accordance with at least one embodiment.

FIG. 7 illustrates an example workflow of an entity monitoring safety feature in an inventory management system, in accordance with at least one embodiment. FIG. 7 includes an inventory management system that may be divided into zones (e.g., as shown in FIG. 7, there may be four zones (quadrants)) 700, 702, 704, 706, one or more access points 708, a plurality of mobile drive units 710, inventory holders 712, a working entity 714, and two different mobile location units 716 and 718. In FIG. 7 the dashed arrows represent travel paths of the mobile drive units 710 and the non-dashed arrows represent communication of information between entities, such as between mobile location unit 716 and a working entity 714. In an embodiment, an inventory management system may be divided into a plurality of areas, such as quadrants, that are each patrolled by a particular mobile location unit, such as units 716 and 718. The mobile location units 716 and 718 may be configured to communicate tracking data for a working entity, such as entity 714 while the entity is located within their respective quadrant. For example, the mobile location unit 716 may capture and communicate tracking data from the working entity 714 to a computer system implementing the entity monitoring safety feature while the entity resides in zone 700 of the inventory management system.

As described herein, in response to receiving location information and tracking data the computer system can generate and provide new paths for mobile drive units 710 to avoid being with a radius distance from working entity 714, create a safe zone or bounded area around working entity 714, or any other embodiments described herein. Further, as the working entity 714 moves from quadrant to quadrant, the mobile location units may perform a hand off operation to guarantee safe passage of the working entity 714 throughout the inventory management system. For example, working entity 714 could move from zone 700 to 706 and the mobile location unit 716 may communicate directly with mobile location unit 718 to hand off responsibility for capturing tracking data from the working entity 714. In an embodiment, the computer system implementing the entity monitoring safety feature may provide instructions to enable the hand off between mobile location units as the working entity 714 accesses various portions of an inventory management system. For example, the computer system may receive location information from the mobile drive units 710 and the mobile location units 716 and 718, as well as tracking data that indicates the respective location of the mobile drive units 710 and mobile location units 716 and 718 within the inventory management system. As described herein, the computer system may utilize the location information and the tracking data to determine that the working entity 714 is moving from one zone to another zone and provide instructions to instruct appropriate mobile location units, such as 716 and 718, to perform a hand off operation that moves responsibility of capturing tracking data from one mobile location unit to the other.

In an embodiment, the mobile location units (716 and 718) may be configured to obtain location information from the mobile drive units 710 and tracking data from the movement of the working entity 714 to determine the respective location of the working entity 714 in its respective zone (such as zone 700 for unit 716) and the respective locations of the mobile drive units 710 within the inventory management system. Each mobile location unit (716 and 718) can determine, utilizing the tracking data and the location information, that a hand off should occur between the mobile location units as the working entity 714 nears a new zone, such as the working entity 714 moving from zone 700 to zone 706. Instructions for handing off responsibility of following and capturing tracking data about the working entity 714 may be generated and communicated by a mobile location unit (such as 716) to another mobile location unit (such as 718) upon the determination that the respective location of the working entity 714 indicates movement from one zone to another zone (700 to 706).

In embodiments, the mobile location units 716 and 718 may be mobile drive units, such as mobile drive units 710, that are assigned or instructed to follow and capture tracking data from the working entity 714 as they move throughout the inventory management system and various zones (700-706). For example, unit 716 may have been assigned to follow and capture tracking data from the working entity 714. Instructions may be generated for mobile drive unit 718 in zone 706 based on receiving the tracking data and a determination that the working entity 714 is moving from zone 700 to zone 706. The generated instructions may instruct the mobile drive unit 718 to follow and capture tracking data from the working entity 714 as they move through zone 706. The unit 716 that was following and capturing tracking data in zone 700 may be provided instructions to perform other operations within zone 700 upon the unit 718 in zone 706 following and capturing tracking data from the working entity 714. Thus, techniques are provided for leveraging the plurality of mobile drive units 710 to act as mobile location units 716 and 718 and implement zone hand off operations which enable efficient use of the mobile drive units 710 as they move throughout the inventory management system and enable safe passage of the working entity 714.

Figure 8:
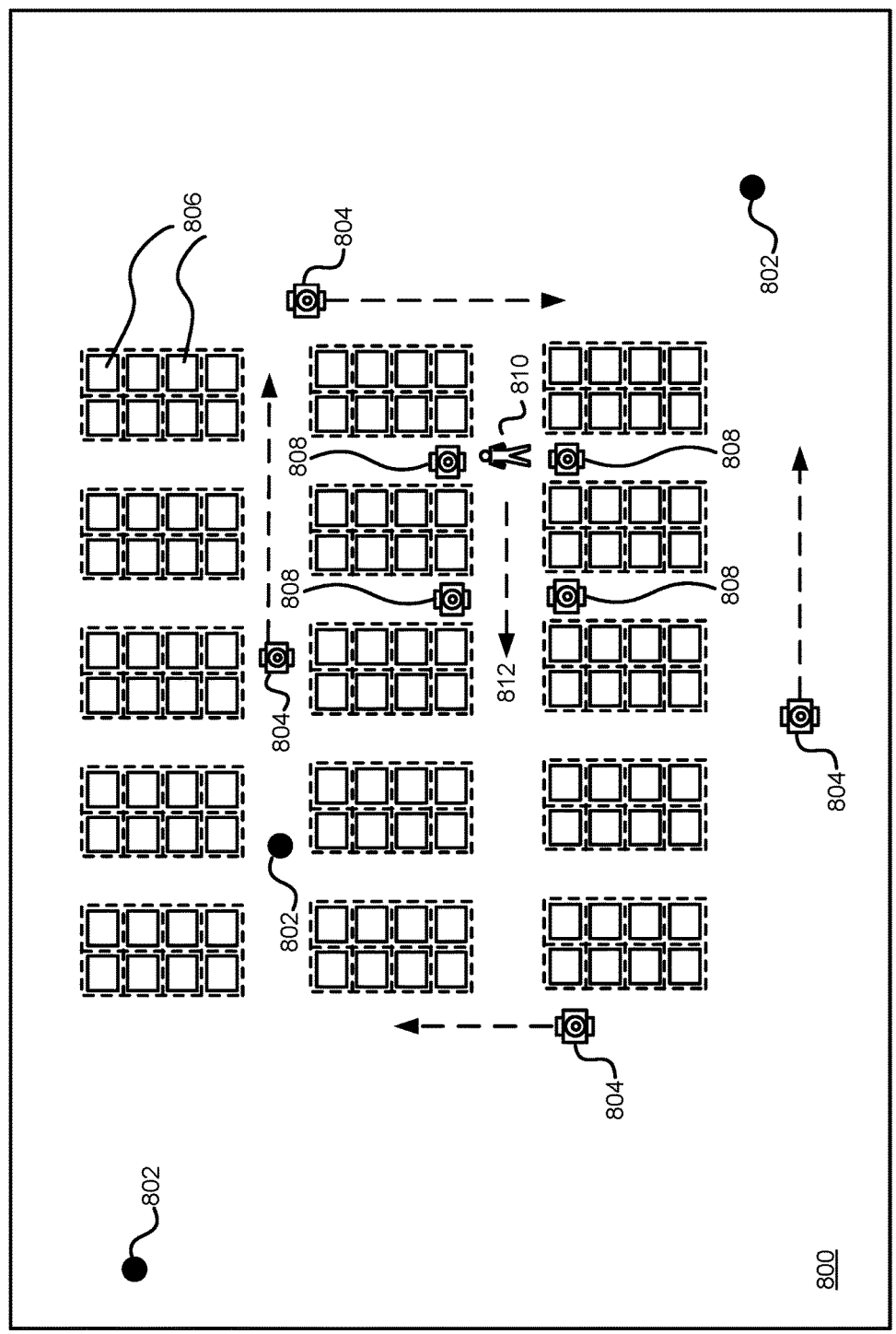
FIG. 8 illustrates an example workflow of an entity monitoring safety feature in an inventory management system, in accordance with at least one embodiment.

FIG. 8 illustrates an example workflow of an entity monitoring safety feature in an inventory management system, in accordance with at least one embodiment. FIG. 8 illustrates an inventory management system 800 that includes one or more access points 802, a plurality of mobile drive units 804, inventory holders 806, mobile location units 808, and a working entity 810. In FIG. 8 the dashed arrows represent movement paths of an entity, such as mobile drive units 804 or working entity 810. In accordance with at least one embodiment, one or more mobile location units 808 may be assigned to physically follow and track a working entity 810 as the entity accesses an inventory management system 800. The computer system implementing the entity monitoring safety feature may receive location information from the mobile drive units 804, mobile location units 808, and tracking data from the mobile location units 808. Further, the computer system may utilize the location information and tracking data to provide a series of paths and stop commands to the mobile location units 808 that create a safe passage area 812 for the working entity 810 to utilize while accessing the inventory management system 800. For example, FIG. 8 illustrates mobile location units 808 blocking passage between particular columns of inventory holders 806 thereby preventing passage by the working entity 810 to other areas of the inventory management system. Additionally, mobile location units 808 or one or more mobile drive units 804 may be positioned under or near any inventory holders 806 bordering the safe passage area 812 to prevent other mobile drive units from entering the safe passage area 812.

The safe passage area 812 determined by the computer system may include providing new paths to the mobile drive units 804 to avoid a bounded area around the working entity 810, slow down while moving in the bounded area around working entity 810 or stop movement altogether while in the bounded area around working entity 810. The working entity may provide a destination point to the computer system before accessing the inventory management system 800 for use in generating the series of paths and stop commands to the mobile location units 808 to aid in the safe passage area 812 for the working entity from the entry point of the inventory management system 800 to the destination point. In some embodiments, the computer system may calculate the series of paths and stop commands in real time based on the location information and tracking data received thus allowing the working entity more mobility within the inventory management system 800.

Figure 9:
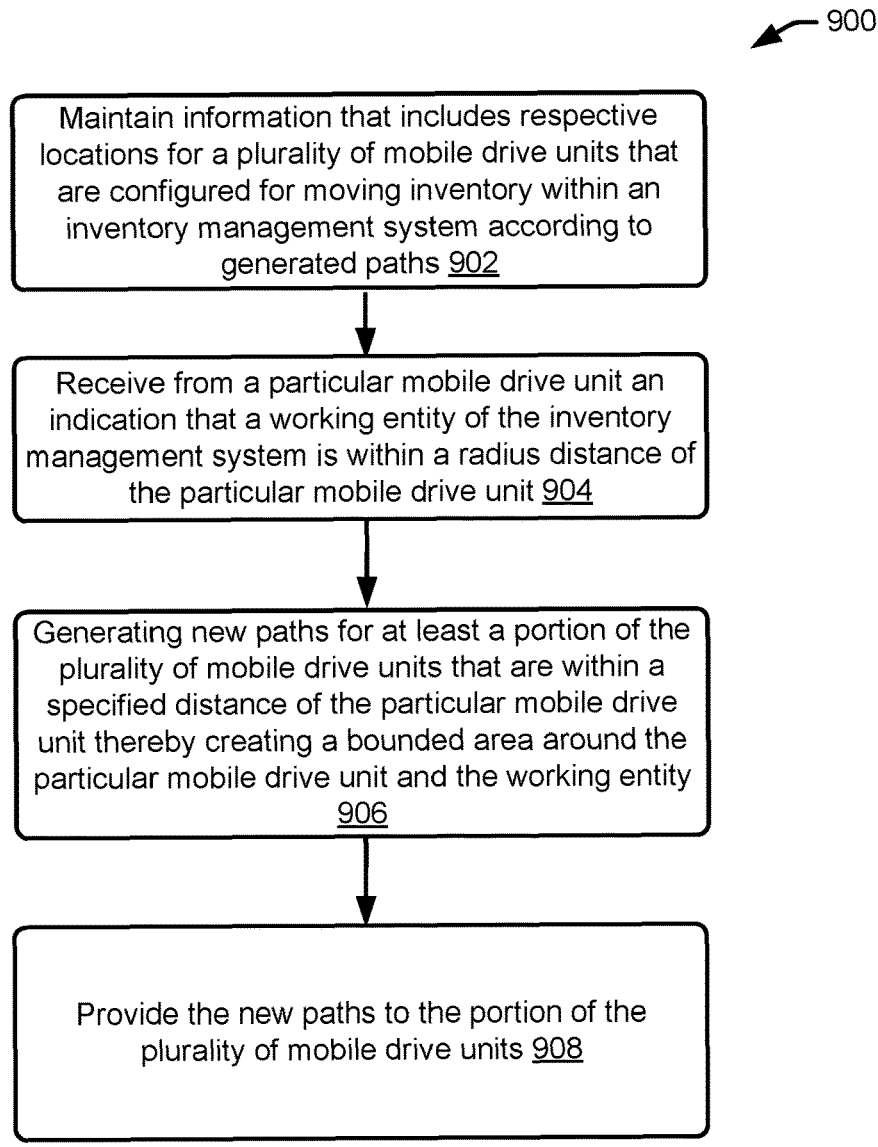
FIG. 9 illustrates an example flow diagram of a process for an entity monitoring safety feature in an inventory management system as described herein, in accordance with at least one embodiment.
Figure 10:
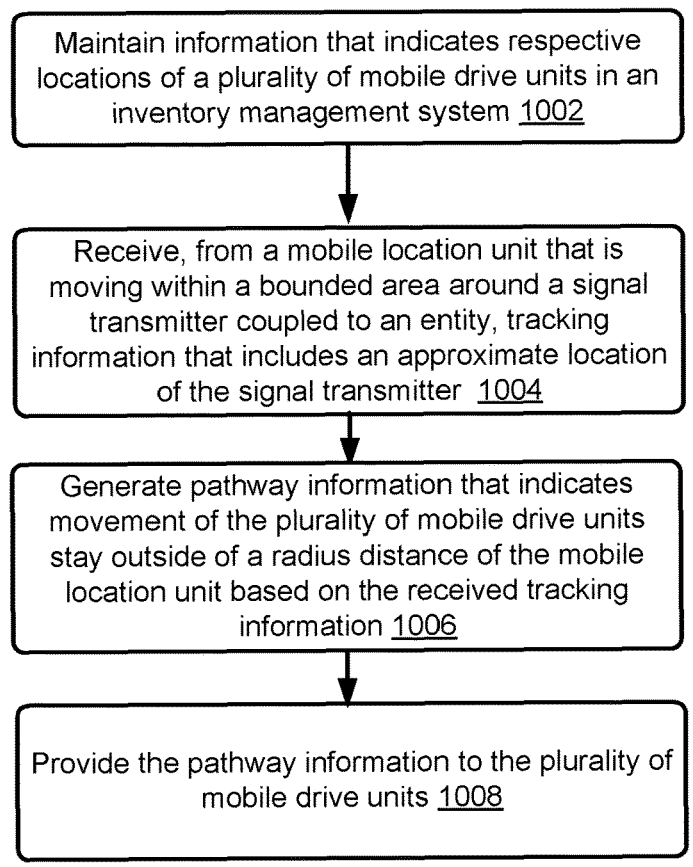
FIG. 10 illustrates an example flow diagram of a process for an entity monitoring safety feature in an inventory management system as described herein, in accordance with at least one embodiment.

FIGS. 9 and 10 illustrate example flows for an entity monitoring safety feature in an inventory management system, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the one or more service provider computers 318 (e.g., utilizing at least one of the entity monitoring safety module 336, the location information module 400, the tracking data module 402, the pathway module 404, the prohibit area module 406, and the user interface module 408 in communication with one or more data stores 410) shown in FIGS. 3 and 4, may perform the processes 900 and 1000 of FIGS. 9 and 10. In FIG. 9 the process 900 may include maintaining information that includes respective locations for a plurality of mobile drive units that are configured for moving within an inventory management system according to generated paths at 902. In an embodiment, the plurality of mobile drive units may communicate the information via access points situated in the inventory management system. The process 900 may include receiving from a particular mobile drive unit an indication that a working entity of the inventory management system is within a radius distance of the particular mobile drive unit at 904. For example, the inventory management system may leverage the location information maintained for the mobile drive units and tracking data or indication that a working entity is near a particular mobile drive unit to generate new paths or a prohibit zone around the location of the particular mobile drive unit or working entity within the inventory management system.

The process 900 may include generating new paths for at least a portion of the plurality of mobile drive units that are within a specified distance of the particular mobile drive unit thereby creating a bounded area around the particular mobile drive unit and the working entity at 906. As described above, instructions can also be provided, via the access points, to a portion of the plurality of mobile drive units within a specified distance of the working entity to either slow down or stop moving altogether. The process 900 may conclude at 908 by providing the new paths to the portion of the plurality of mobile drive units.

In FIG. 10, the process 1000 may include maintaining information that indicates respective locations of a plurality of mobile drive units in an inventory management system 1002. In an embodiment, the location information may be communicated by the plurality of mobile drive units periodically or in real time as they move throughout the inventory management system. The process 1000 may include receiving, from a mobile location unit that is moving within a bounded area around a signal transmitter coupled to an entity, tracking information that includes an approximate location of the signal transmitter 1004. In an embodiment, the bounded area around the signal transmitter may be defined by a system administrator associated with the entity monitoring safety feature in an inventory management system. In embodiments, the bounded area may be determined by the computer system implementing embodiments described herein utilizing portions of the location information and tracking data such as the speed of entities (mobile drive units, mobile location units, working entity) and direction of the entities.

The process 1000 may include generating pathway information for the plurality of mobile drive units to stay outside a radius distance of the mobile location unit based on the received tracking information at 1006. As described above, the radius distance can be predefined by an administrator or calculated by a computer system implementing the entity monitoring safety feature utilizing various data points such as how many working entities are currently accessing the inventory management system, how many mobile drive units are currently moving, access point strength in portions of the inventory management system, or available mobile location units. The process 1000 may conclude at 1008 by providing the pathway information to the plurality of mobile drive units. The pathway information may be provided to the plurality of mobile drive units via access points situated in the inventory management system.

Figure 11:
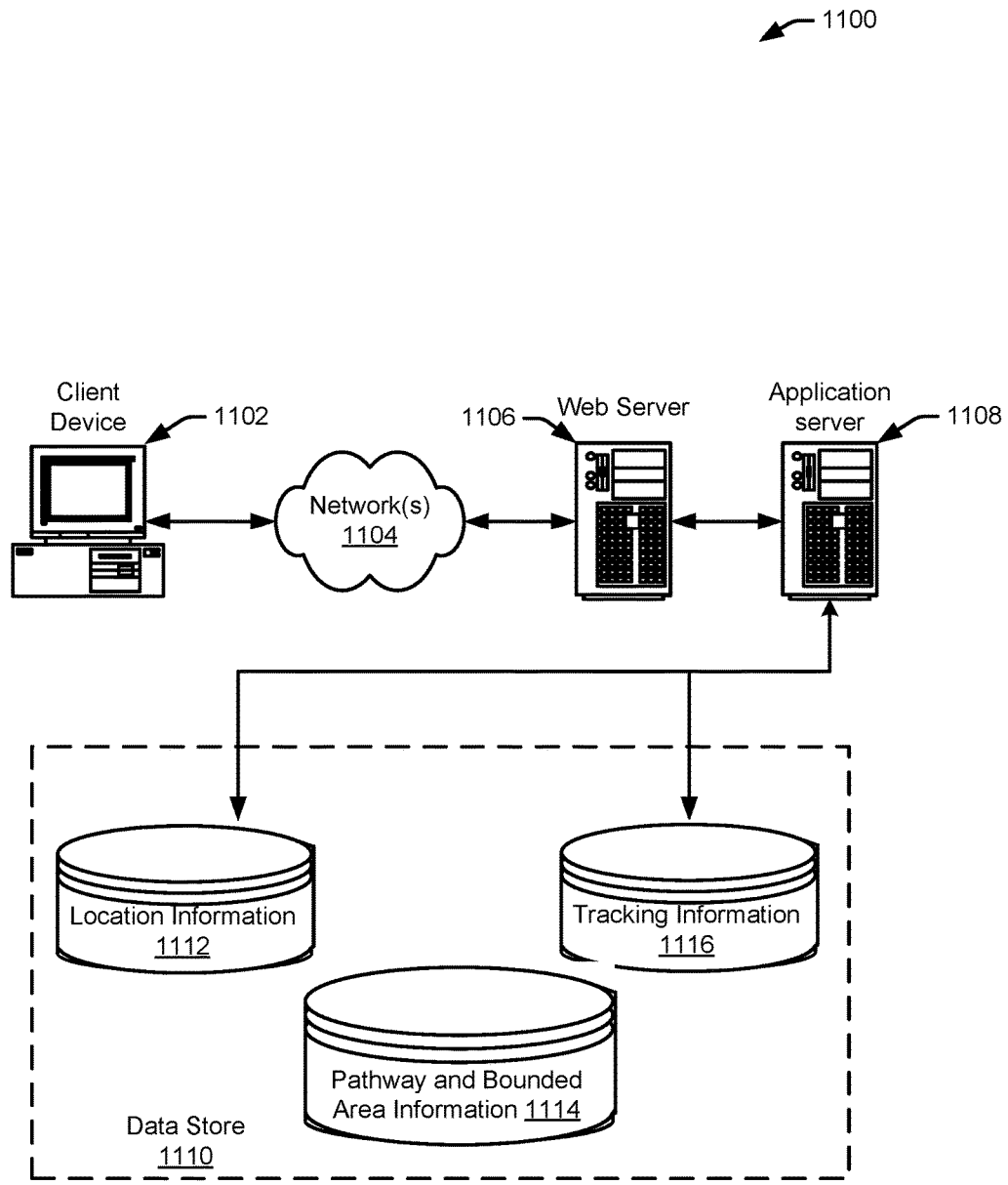
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages or information over an appropriate network 1104 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing location information 1112 and tracking information 1116, which can be used to generate new paths for the plurality of mobile drive units to avoid a working entity moving throughout the inventory management system. The data store also is shown to include a mechanism for storing pathway and bounded area information 1114, which can be used for generating pathway instructions, movement instructions, or a UI displaying location and pathway information associated with the plurality of mobile drive units, a mobile location unit, or the working entity in the inventory management system. It should be understood that there can be many other aspects that may need to be stored in the data store, such as speed, general location, and direction of the working entity, and zone information for the inventory management system, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. An inventory management system, comprising:
   a plurality of mobile drive units configured to move within a materials handling facility according to generated paths and configured to communicate respective location data of the plurality of mobile drive units within the materials handling facility;
   a mobile location unit configured to communicate tracking data of a working entity within the materials handling facility, the tracking data including an approximate location of the working entity within the materials handling facility relative to the mobile location unit; and
   a computing device configured to:
     receive the location data for the plurality of mobile drive units;
     assign the mobile location unit to follow the working entity within the materials handling facility based at least in part an indication of a signal from an individual mobile drive unit of the plurality of mobile drive units, the signal identifying that the working entity has entered the materials handling facility;
     receive the tracking data from the mobile location unit assigned to the working entity;
     generate a bounded area around the working entity and the mobile location unit based at least in part on the tracking data;
     generate a new path for at least one of the plurality of mobile drive units within the materials handling facility based at least in part on the bounded area; and
     instruct an associated propulsion component of the at least one of the plurality of mobile drive units to alter a current path and utilize the new path to avoid the bounded area.

2. The inventory management system of claim 1, wherein the mobile location unit and the plurality of mobile drive units comprises a signal receiver and the working entity comprises a signal transmitter, the signal receiver receiving the tracking data from the signal transmitter, wherein the signal receiver and the signal transmitter comprise a configuration including at least one of: an ultra-wide band radio configuration, an infrared light configuration, a laser configuration, a radio frequency link configuration, an invisible light configuration, a video tracking configuration, or an ultrasonic configuration.

3. The inventory management system of claim 1, wherein the mobile location unit is configured to follow the working entity within the bounded area around the working entity.

4. The inventory management system of claim 1, wherein the computing device is further configured to provide instructions to the plurality of mobile drive units to stop movement within the materials handling facility in response to the computing device failing to receive the tracking data from the mobile location unit for a predetermined time period.

5. A computer-implemented method, comprising:
   receiving, by a computer system, location information that indicates respective locations of a plurality of mobile drive units within a facility, a mobile drive unit of the plurality of mobile drive units configured to detect an entity within the facility based at least in part on a signal provided by a signal transmitter associated with the entity;
   receiving, by the computer system and from a particular mobile drive unit of the plurality of mobile drive units, the signal identifying the entity within the facility;
   identifying, by the computer system, a portion of the facility that corresponds to a location for the entity based at least in part on the signal and corresponding location information for the particular mobile drive unit; and generating, by the computer system, a series of pathway instructions to be provided to one or more mobile drive units that are moving within a bounded area around the location that corresponds to the entity based at least in part the signal and the identified portion of the facility, the series of pathway instructions causing associated propulsion components of the one or more mobile drive units to alter a current path and create a particular path for the entity to utilize while moving within the facility and avoid other mobile drive units moving throughout the facility.

6. The computer-implemented method of claim 5, further comprising generating, by the computer system, instructions to be provided to the plurality of mobile drive units to decrease speed of movement when traveling within a bounded area around the signal transmitter associated with the entity based at least in part on updated location information from the one or more mobile drive units.

7. The computer-implemented method of claim 5, further comprising receiving, by the computer system and from a mobile location unit, tracking information that includes an approximate location of the signal transmitter associated with the entity relative to the mobile location unit, wherein the bounded area around the location is determined by the computer system based at least in part on the tracking information and the identified portion of the facility.

8. The computer-implemented method of claim 5, further comprising determining an available mobile location unit to assign to the entity seeking access to the facility based at least in part on the location information and tracking information, wherein the tracking information includes a second number of entities already accessing the facility.

9. The computer-implemented method of claim 5, wherein the bounded area corresponds to an area around the signal transmitter that is associated with the entity and is specified by an administrator associated with the facility.

10. The computer-implemented method of claim 9, wherein the bounded area around the signal transmitter that is associated with the entity is determined based at least in part on the location information and tracking information from a mobile location unit that includes at least one of a speed or a direction of the entity.

11. A computer-readable storage medium storing computer-executable instructions that, when executed with a computer system, cause the computer system to perform operations comprising:

receiving location information that includes respective locations of a plurality of mobile drive units and mobile location units in an inventory management system;

receiving, from a first mobile location unit that is moving around a working entity, tracking information that includes an approximate location of the working entity relative to the first mobile location and corresponding location information for the first mobile location unit that indicates a first portion of the inventory management system in which the working entity is moving;

determining that the working entity is moving from the first portion of the inventory management system to a second portion of the inventory management system based at least in part on the tracking information and the corresponding location information from the first mobile location unit; and providing first instructions to the first mobile location unit to perform a hand off operation that assigns a second mobile location unit to move around the working entity by instructing an associated propulsion component of the second mobile location unit to alter a current path based at least in part on the determination that the working entity is moving from the first portion of the inventory management system to the second portion of the inventory management system.

12. The computer-readable storage medium of claim 11, wherein providing the first instructions to assign the second mobile location unit to move around the working entity is based at least in part on status information received from the first mobile location unit.

13. The computer-readable storage medium of claim 12, wherein the status information includes at least one of proximity information indicating proximity of the first mobile location unit to the working entity, battery state information of the first mobile location unit, information indicating a speed of the first mobile location unit, or an indication that the first mobile location unit has failed to capture the tracking information over a predetermined time period.

14. The computer-readable storage medium of claim 11, wherein the operations further comprise providing a user interface that displays a representation of the inventory management system, the respective locations of the plurality of mobile drive units, a representation of the working entity, the first mobile location unit, the second mobile location unit, and current paths being utilized by the plurality of mobile drive units.

15. The computer-readable storage medium of claim 14, wherein the user interface is further configured to receive input from a user indicating a request to access the inventory management system.

16. The computer-readable storage medium of claim 14, wherein the user interface is further configured to receive input from a user for manually overriding current instructions for the plurality of mobile drive units and stopping movement of the plurality of mobile drive units in the inventory management system.

17. The computer-readable storage medium of claim 11, wherein the operations further comprise:

receiving an indication that at least one mobile drive unit of the plurality of mobile drive units has entered an area around the working entity; and providing second instructions to the at least one mobile drive unit to stop movement based at least in part on the indication.

18. The computer-readable storage medium of claim 17, wherein the operations further comprise providing third instructions to one or more mobile drive units of the plurality of mobile drive units to move to an intersection between the at least one mobile drive unit and the first mobile location unit or the second mobile location unit within the area in response to receiving the indication, the intersection determined based at least in part on the indication and the location information.

19. The computer-readable storage medium of claim 11, wherein the first mobile location unit and the second mobile location unit are configured to utilize a signal receiver that corresponds to a signal transmitter associated with the working entity to generate the tracking information.

* * * * *